United States Patent
Herschler et al.

(10) Patent No.: US 8,504,460 B2
(45) Date of Patent: Aug. 6, 2013

(54) SYSTEM AND METHOD FOR PROVIDING A FINANCIAL INSTRUMENT UTILIZING A LIABILITY RATIO

(75) Inventors: Jacob M. Herschler, Southport, CT (US); Daniel O. Kane, Florham Park, NJ (US); N. David Kuperstock, Woodbridge, CT (US); Robert F. O'Donnell, Harwinton, CT (US); Steven L. Putterman, West Hartford, CT (US); Dain E. Runestad, Woodbridge, CT (US); Robert J. Schwartz, West Granby, CT (US); Nicholas Berardis, Jr., Middlebury, CT (US); John L. Grucza, Southington, CT (US); Michael A. Guido, Southbury, CT (US); J. Scott Dunn, Rocky Hill, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 0 days.

(21) Appl. No.: 13/029,858

(22) Filed: Feb. 17, 2011

(65) Prior Publication Data
US 2011/0145169 A1    Jun. 16, 2011

Related U.S. Application Data

(63) Continuation of application No. 11/671,625, filed on Feb. 6, 2007, now Pat. No. 7,895,109.

(51) Int. Cl.
*G06Q 40/00* (2012.01)
(52) U.S. Cl.
USPC .................................................. 705/36 R
(58) Field of Classification Search
USPC ............................................................. 705/4
See application file for complete search history.

(56) References Cited

U.S. PATENT DOCUMENTS

| 5,126,936 | A |   | 6/1992 | Champion et al. |
| 5,148,365 | A |   | 9/1992 | Dembo |
| 5,214,579 | A | * | 5/1993 | Wolfberg et al. ........... 705/36 R |
| 5,291,398 | A |   | 3/1994 | Hagan |
| 5,631,828 | A |   | 5/1997 | Hagan |
| 5,754,980 | A |   | 5/1998 | Anderson et al. |
| 5,812,987 | A |   | 9/1998 | Luskin et al. |
| 5,893,071 | A |   | 4/1999 | Cooperstein |
| 5,933,815 | A |   | 8/1999 | Golden |
| 6,064,969 | A |   | 5/2000 | Haskins |

(Continued)

FOREIGN PATENT DOCUMENTS
WO    WO 92/22036    12/1992

OTHER PUBLICATIONS

Supplement Prospectus, "Enhanced Credit Variable Annuity, Pennant Select and Penn Freedom" includes Supplement dated Oct. 25 and Aug. 22, 2005 to Prospectus dated May 1, 2005 Penn Mutual Life Insurance Company, 50 pages, Oct. 25, 2005 Aug. 25, 2005.

(Continued)

*Primary Examiner* — Olabode Akintola
(74) *Attorney, Agent, or Firm* — Baker Botts L.L.P.

(57) ABSTRACT

One embodiment of the invention is a method for providing a financial instrument including determining a current account balance for a financial account, calculating a liability ratio for the financial account, and determining whether to transfer at least a portion of the account balance from a variable sub-account to a low-risk sub-account based on the liability ratio.

40 Claims, 12 Drawing Sheets

U.S. PATENT DOCUMENTS

| | | | |
|---|---|---|---|
| 6,064,986 | A | 5/2000 | Edelman |
| 6,219,650 | B1 | 4/2001 | Friend et al. |
| 6,253,192 | B1 | 6/2001 | Corlett et al. |
| 6,275,807 | B1 | 8/2001 | Schirripa |
| 6,278,983 | B1 | 8/2001 | Ball |
| 6,343,272 | B1 | 1/2002 | Payne et al. |
| 6,360,210 | B1 | 3/2002 | Wallman |
| 6,415,267 | B1 | 7/2002 | Hagan |
| 6,592,030 | B1 | 7/2003 | Hardesty |
| 6,611,808 | B1 | 8/2003 | Preti et al. |
| 6,611,815 | B1 | 8/2003 | Lewis et al. |
| 6,615,180 | B1 | 9/2003 | Anderton et al. |
| 6,615,188 | B1 | 9/2003 | Breen et al. |
| 6,636,834 | B1 | 10/2003 | Schirripa |
| 7,089,201 | B1 | 8/2006 | Dellinger et al. |
| 7,457,776 | B1 * | 11/2008 | Caruso et al. ............... 705/36 R |
| 2001/0014873 | A1 | 8/2001 | Henderson et al. |
| 2002/0156710 | A1 | 10/2002 | Ryder |
| 2002/0174042 | A1 | 11/2002 | Arena et al. |
| 2002/0188540 | A1 | 12/2002 | Fay et al. |
| 2002/0194098 | A1 | 12/2002 | Stiff et al. |
| 2003/0004844 | A1 | 1/2003 | Hueler |
| 2003/0014285 | A1 | 1/2003 | Richard |
| 2003/0083972 | A1 | 5/2003 | Williams |
| 2003/0088430 | A1 | 5/2003 | Ruark |
| 2003/0105690 | A1 | 6/2003 | Brown et al. |
| 2003/0120570 | A1 | 6/2003 | Dellinger et al. |
| 2003/0154161 | A1 | 8/2003 | Stahl et al. |
| 2003/0187764 | A1 | 10/2003 | Abbs et al. |
| 2003/0233301 | A1 | 12/2003 | Chen et al. |
| 2004/0078244 | A1 | 4/2004 | Katcher |
| 2004/0088236 | A1 | 5/2004 | Manning |
| 2004/0148202 | A1 | 7/2004 | Siefe et al. |
| 2004/0172350 | A1 | 9/2004 | Atkinson et al. |
| 2004/0177022 | A1 | 9/2004 | Williams et al. |
| 2004/0215493 | A1 * | 10/2004 | Koppes et al. ..................... 705/4 |
| 2005/0060251 | A1 | 3/2005 | Schwartz et al. |
| 2005/0065809 | A1 | 3/2005 | Henze |
| 2005/0086085 | A1 | 4/2005 | Berlin et al. |
| 2005/0144124 | A1 | 6/2005 | Stiff et al. |
| 2005/0234747 | A1 | 10/2005 | Kavanaugh |
| 2005/0234821 | A1 | 10/2005 | Benham et al. |
| 2005/0256748 | A1 * | 11/2005 | Gore et al. ........................ 705/4 |
| 2005/0278200 | A1 | 12/2005 | Brawley et al. |
| 2007/0011086 | A1 | 1/2007 | Dellinger et al. |

OTHER PUBLICATIONS

Robert F. O'Donnell, et al., "Financial Instrument Providing a Guaranteed Growth Rate and a Guarantee of Lifetime Payments," U.S. Appl. No. 11/404,979, pending, 58 pages, Filed Apr. 4, 2006.

State Farm Insurance, Like a good neighbor, State Farm is there, Future Income Plus, 3 pages.

Journal of Financial Planning, Article 6, A Stages Model for Planning Retirement Income Distribution, Michael D. Everett, et al., 10 pages, Jun. 2003.

Transamerica Life Insurance Company; Transamerica Announces New Liberty Flexible Premium Variable Annuity with 5 for Life Rider; 2005 Transamerica Capital, Inc.; 1 page, Jan. 24, 2005.

Jackson National Life Insurance Company; Variable Annuities; Perspective II; Features and Benefit Options Guide; VADV10871; pp. 1 to 25, Nov. 2004.

US Allianz High Five Variable Annuity Prospectus; A Flexible Payment Variable Annuity: Allianz Life Variable Account B; Allianz Life. The best at next, pp. 1 to 80, Apr. 29, 2005.

IL Annuity & Insurance Co Separate Account 1; 485BPOS IL Annuity and Insurance Form N-4 Post-Effective; File No. 033-089028; GSI; Livedgar Information Provided by Global Securities Information, Inc., pp. 1 to 99, Apr. 26, 1996.

Manufacturers Life Insurance Co USA Separate Account H; 485APOS; The Manufacturers Life Insurance Company; GSI; Livedgar Information provided by Global Securities Information, Inc., pp. 1 to 161, Mar. 1, 1999.

Prospectus MetLife Investors Insurance Company; MetLife; Class Variable Annuities VA, May 1, 2005.

I4Life Advantage, "Lincoln ChoicePlus Variable Annuities with I4LIFE@Advantage and Optional Guaranteed Income Benefit," http://www.lfg.com/LincolnPageServer?LFGPage=/lfg/bdc/prd/ann/i41/index.html&KPage_Action=PRIN . . . , 2 pages, Printed Jan. 25, 2005.

Manulife Financial, "Venture Combination Fixed and Variable Annuity," Financial Planning Resources, Inc., 4 pages, Jul. 1999.

Brochure, "Optional Retirement Program Overview," http://www6.ingretirementplans.com/SponsorExtranet/UTexas/YourPlanHighlights/10UtexasORPovervie . . . , ING North America Insurance Corporation, 3 pages, © 2002-2004 Printed Jan. 25, 2005.

Brochure, "403(b) Tax Deferred Annuity (TDA) Overview," http://www6.ingretirementplans.com/SponsorExtranet/UTexas/YourPlarnHighlights/20UTexasTDA.html, ING North America Insurance Corporation, 3 pages, © 2002-2004 Printed Jan. 25, 2005.

Brochure, "ORP and TDA Payout Options," http://www6.ingretirementplans.com/SponsorExtranet/UTexas/YourPlanHighlights/30Utexas Payout.html, ING North America Insurance Corporation, 1 page, © 2002-2004 Printed Jan. 25, 2005.

Brochure, "TDA Fund Options," http://www6.ingretirementplans.com/SponsorExtranet/UTexas/AboutYourInvestments/20UTexasTDAfun . . . , ING North America Insurance Corporation, 4 pages, © 2002-2004 Printed Jan. 25, 2005.

White Paper, "Manulife Offers Payout Floor on Variables," Best's Review—Life-Health Insurance Edition, BestWire, 1 page, Jul. 20, 1998.

GSI, "Variable Annuity Account B of ING Life Ins & Annuity Co," 485BPOS, Aetna Life Insurance and Annuity Company Form N-4, www.gsionline.com, LIVEDGAR® Information Provided by Global Securities Information, Inc., 25 pages, as filed w/SEC on Nov. 24, 1999.

Brochure, "Guaranteed Minimum Withdrawal, Accumulation and Death Benefit Rider (GMWB/AB/DB)", Penn Mutual, T2090, 2 pages, Sep. 2005.

Supplement Prospectus, "Enhanced Credit Variable Annuity, Pennant Select and Penn Freedom" includes Supplement dated Oct. 25 and Aug. 22, 2005 to Prospectus dated May 1, 2005 Penn Mutual Life Insurance Company, 50 pages.

Robert F. O'Donnell, et al., "Financial Instrument Providing a Guaranteed Growth Rate and a Guarantee of Lifetime Payments," U.S. Appl. No. 11/404,979, pending, 58 pages, Filed Apr. 14, 2006.

Peter C. Carlson, et al., "Financial Instrument Providing a Portable Guarantee," U.S. Appl. No. 11/531,872, pending, 60 pages, Filed Sep. 14, 2006.

Mark J. Foley, "Financial Instrument Utilizing a Customer Specific Date," U.S. Appl. No. 11/531,948, pending, 58 pages, Filed Sep. 14, 2006.

Peter C. Carlson, et al., "Financial Instrument Utilizing an Optional Benefit Election," U.S. Appl. No. 11/531,977, pending, 54 pages, Filed Sep. 14, 2006.

Jacob M. Herschler et. al., "System and Method for Providing a Financial Instrument with an Asset Transfer Feature," U.S. Appl. No. 11/671,598, sending, 89 pages, Filed Feb. 6, 2007.

Jacob M. Herschler et. al., "System and Method for Providing a Financial Instrument with a Periodic Step-Up Feature," U.S. Appl. No. 11/671,679, pending, 73 pages, Filed Feb. 6, 2007.

Hubert B. Mueller, "Variable Annuities in the 1980s and Beyond," Sep. 6, 1991, Actuarial Research Clearinghouse, 1991, vol. 3, Sep. 6, 1991.

Neal Lapierre, "Armuity Types," Forefield, Inc. pp. 1-3, 2003.

M.J. Brennan et al., "Time-Invariant Portfolio Insurance Strategies," The Journal of Finance, vol. 43, No. 2, http://www.jstor.org, 18 pages (printed Mar. 15, 2007), Jun. 1988.

* cited by examiner

| ISSUE AGE 55 | | | |
|---|---|---|---|
| ATTAINED AGE | AGE 55 Q FACTOR | ATTAINED AGE | AGE 55 Q FACTOR |
| 55 | 0.79 | 80 | 0.60 |
| 56 | 0.79 | 81 | 0.59 |
| 57 | 0.78 | 82 | 0.59 |
| 58 | 0.77 | 83 | 0.59 |
| 59 | 0.76 | 84 | 0.59 |
| 60 | 0.75 | 85 | 0.59 |
| 61 | 0.75 | 86 | 0.59 |
| 62 | 0.74 | 87 | 0.59 |
| 63 | 0.73 | 88 | 0.58 |
| 64 | 0.72 | 89 | 0.58 |
| 65 | 0.71 | 90 | 0.57 |
| 66 | 0.70 | 91 | 0.56 |
| 67 | 0.70 | 92 | 0.55 |
| 68 | 0.69 | 93 | 0.54 |
| 69 | 0.68 | 94 | 0.52 |
| 70 | 0.67 | 95 | 0.50 |
| 71 | 0.66 | | |
| 72 | 0.65 | | |
| 73 | 0.64 | | |
| 74 | 0.64 | | |
| 75 | 0.63 | | |
| 76 | 0.62 | | |
| 77 | 0.61 | | |
| 78 | 0.61 | | |
| 79 | 0.60 | | |

*FIGURE 4A*

| ISSUE AGE 60 | | | |
|---|---|---|---|
| ATTAINED AGE | AGE 60 Q FACTOR | ATTAINED AGE | AGE 60 Q FACTOR |
| 60 | 0.88 | 80 | 0.78 |
| 61 | 0.88 | 81 | 0.78 |
| 62 | 0.87 | 82 | 0.77 |
| 63 | 0.87 | 83 | 0.77 |
| 64 | 0.86 | 84 | 0.77 |
| 65 | 0.86 | 85 | 0.77 |
| 66 | 0.85 | 86 | 0.77 |
| 67 | 0.85 | 87 | 0.76 |
| 68 | 0.84 | 88 | 0.77 |
| 69 | 0.84 | 89 | 0.77 |
| 70 | 0.83 | 90 | 0.77 |
| 71 | 0.83 | 91 | 0.77 |
| 72 | 0.82 | 92 | 0.77 |
| 73 | 0.82 | 93 | 0.76 |
| 74 | 0.81 | 94 | 0.76 |
| 75 | 0.81 | 95 | 0.75 |
| 76 | 0.80 | | |
| 77 | 0.79 | | |
| 78 | 0.79 | | |
| 79 | 0.79 | | |

FIGURE 4B

ANNUITY FACTOR (a)

| Month AGE | 0 | 1 | 2 | 3 | 4 | 5 | 6 | 7 | 8 | 9 | 10 | 11 |
|---|---|---|---|---|---|---|---|---|---|---|---|---|
| 55 | 231.99 | 231.62 | 231.25 | 230.88 | 230.52 | 230.15 | 229.78 | 229.41 | 229.04 | 228.67 | 228.31 | 227.94 |
| 56 | 227.57 | 227.19 | 226.82 | 226.44 | 226.07 | 225.69 | 225.32 | 224.94 | 224.57 | 224.19 | 223.82 | 223.44 |
| 57 | 223.07 | 222.68 | 222.30 | 221.92 | 221.54 | 221.16 | 220.77 | 220.39 | 220.01 | 219.63 | 219.24 | 218.86 |
| 58 | 218.48 | 218.09 | 217.70 | 217.31 | 216.92 | 216.53 | 216.14 | 215.75 | 215.36 | 214.98 | 214.59 | 214.20 |
| 59 | 213.81 | 213.41 | 213.01 | 212.62 | 212.22 | 211.82 | 211.43 | 211.03 | 210.63 | 210.24 | 209.84 | 209.44 |
| 60 | 209.05 | 208.64 | 208.24 | 207.84 | 207.43 | 207.03 | 206.63 | 206.22 | 205.82 | 205.42 | 205.01 | 204.61 |
| 61 | 204.20 | 203.79 | 203.38 | 202.97 | 202.56 | 202.15 | 201.74 | 201.33 | 200.92 | 200.51 | 200.10 | 199.69 |
| 62 | 199.28 | 198.86 | 198.45 | 198.03 | 197.61 | 197.20 | 196.78 | 196.37 | 195.95 | 195.53 | 195.12 | 194.70 |
| 63 | 194.28 | 193.86 | 193.44 | 193.02 | 192.59 | 192.17 | 191.75 | 191.33 | 190.91 | 190.48 | 190.06 | 189.64 |
| 64 | 189.22 | 188.79 | 188.36 | 187.94 | 187.51 | 187.08 | 186.65 | 186.23 | 185.80 | 185.37 | 184.95 | 184.52 |
| 65 | 184.09 | 183.66 | 183.23 | 182.80 | 182.37 | 181.93 | 181.50 | 181.07 | 180.64 | 180.21 | 179.78 | 179.35 |
| 66 | 178.91 | 178.48 | 178.04 | 177.61 | 177.17 | 176.74 | 176.30 | 175.87 | 175.43 | 175.00 | 174.56 | 174.13 |
| 67 | 173.69 | 173.25 | 172.81 | 172.38 | 171.94 | 171.50 | 171.06 | 170.62 | 170.18 | 169.75 | 169.31 | 168.87 |
| 68 | 168.43 | 167.99 | 167.55 | 167.11 | 166.67 | 166.23 | 165.79 | 165.34 | 164.90 | 164.46 | 164.02 | 163.58 |
| 69 | 163.14 | 162.70 | 162.25 | 161.81 | 161.37 | 160.93 | 160.48 | 160.04 | 159.60 | 159.16 | 158.71 | 158.27 |
| 70 | 157.83 | 157.38 | 156.94 | 156.50 | 156.05 | 155.61 | 155.17 | 154.72 | 154.28 | 153.84 | 153.39 | 152.95 |
| 71 | 152.50 | 152.06 | 151.62 | 151.17 | 150.73 | 150.28 | 149.84 | 149.40 | 148.95 | 148.51 | 148.06 | 147.62 |
| 72 | 147.18 | 146.73 | 146.29 | 145.85 | 145.40 | 144.96 | 144.52 | 144.07 | 143.63 | 143.19 | 142.74 | 142.30 |
| 73 | 141.86 | 141.41 | 140.97 | 140.53 | 140.09 | 139.65 | 139.20 | 138.76 | 138.32 | 137.88 | 137.44 | 136.99 |
| 74 | 136.55 | 136.11 | 135.67 | 135.23 | 134.79 | 134.35 | 133.91 | 133.47 | 133.04 | 132.60 | 132.16 | 131.72 |
| 75 | 131.28 | 130.84 | 130.40 | 129.97 | 129.53 | 129.09 | 128.66 | 128.22 | 127.78 | 127.35 | 126.91 | 126.47 |

FIGURE 5

SYSTEM AND METHOD FOR PROVIDING A FINANCIAL INSTRUMENT UTILIZING A LIABILITY RATIO

RELATED APPLICATIONS

This application is a continuation of U.S. application Ser. No. 11/671,625, filed Feb. 6, 2007.

TECHNICAL FIELD OF THE INVENTION

This invention relates generally to financial instruments and more particularly to a system and method for providing a financial instrument utilizing a liability ratio.

BACKGROUND OF THE INVENTION

There are numerous financial instruments available on the market and people invest in them for a variety of reasons. Some investors are interested in obtaining high rates of return on their investments, while others are willing to forego high rates of return in exchange for a reduced level of financial risk. Some investors are interested in obtaining a steady income stream for a period of years or possibly for life. When making decisions regarding the selection of a financial instrument, there are multiple tradeoffs. Typically, the lower the risk is, the lower the expected rate of return will be. There are also numerous tax consequences that may be considered in selecting a financial instrument.

An annuity is one form of financial instrument. A typical annuity is used to pay a certain sum of money at specified intervals, with the payment amount being based on a given amount of principal. There are many different types of annuities. For example, annuities can be immediate or deferred, fixed or variable, and single payment or multiple payment.

In a typical immediate annuity, a lump sum of money is exchanged, for a stream of payments to begin immediately. In a typical deferred annuity, an investment is made with the anticipation that it will grow and a stream of payments based upon the value of the account at a future time will begin at some point in the future. A fixed annuity is one in which the rate of return is specified at the time the annuity is purchased. A variable annuity typically allows the purchaser to select from a group of potential investments and the rate of return depends upon the performance of the selected investments.

In some cases, annuities are offered for sale with a variety of electable options. Upon election, these options may provide additional guaranteed benefits such as death benefits, living benefits, cash surrender benefits, or joint and survivor income payment options.

SUMMARY OF THE INVENTION

According to one embodiment of the invention, a method for providing a financial instrument includes determining a current account balance for a financial account at least a portion of which is held in a variable sub-account, calculating a liability ratio for the financial account, and determining whether to transfer at least a portion of the account balance from a variable sub-account to a low-risk sub-account based on the liability ratio. The financial account is associated with a first guarantee of a protected value, the protected value including at least an amount based upon the initial account balance growing at a minimum positive growth rate for at least a defined period of time or until one or more defined events occur, whichever is sooner. The financial account is also associated with a second guarantee that a beneficiary may periodically receive a transfer of an amount of money for the life of a designated party, wherein the amount comprises a percentage of the protected value at the time of a particular event, wherein the percentage of the protected value is fixed upon an effective date of the second guarantee, and wherein the transfer may be due to withdrawal from the account or due to benefit payments made to the beneficiary, provided that the amount may vary based upon withdrawals from the account in excess of a particular limit. In certain embodiments, the variable sub-account includes one or more investments selected by an account holder and the low-risk sub-account includes one or more investments having a lower expected return and a lower risk than the variable sub-account.

Certain embodiments of the present invention may provide various technical advantages. For example, certain embodiments may allow an account holder to maintain liquidity in an account while at the same time receiving a guarantee of lifetime income and a guaranteed growth rate. Certain embodiments may also allow an account holder to receive the potentially higher rates of return associated with variable annuities while at the same time avoiding the associated risk of loss by obtaining a guaranteed growth rate. Certain embodiments may also allow an account holder to retain control over certain investment decisions while at the same time mitigating the risk to the issuer associated with one or more guarantees. Certain embodiments may provide improved alternatives for balancing the security associated with guaranteed or fixed return investments with the potential financial benefits associated with variable return investments.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIGS. 4A and 4B illustrate tables of example age-based factor values;

FIG. 5 illustrates a table of example annuity factor values;

DETAILED DESCRIPTION OF THE EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
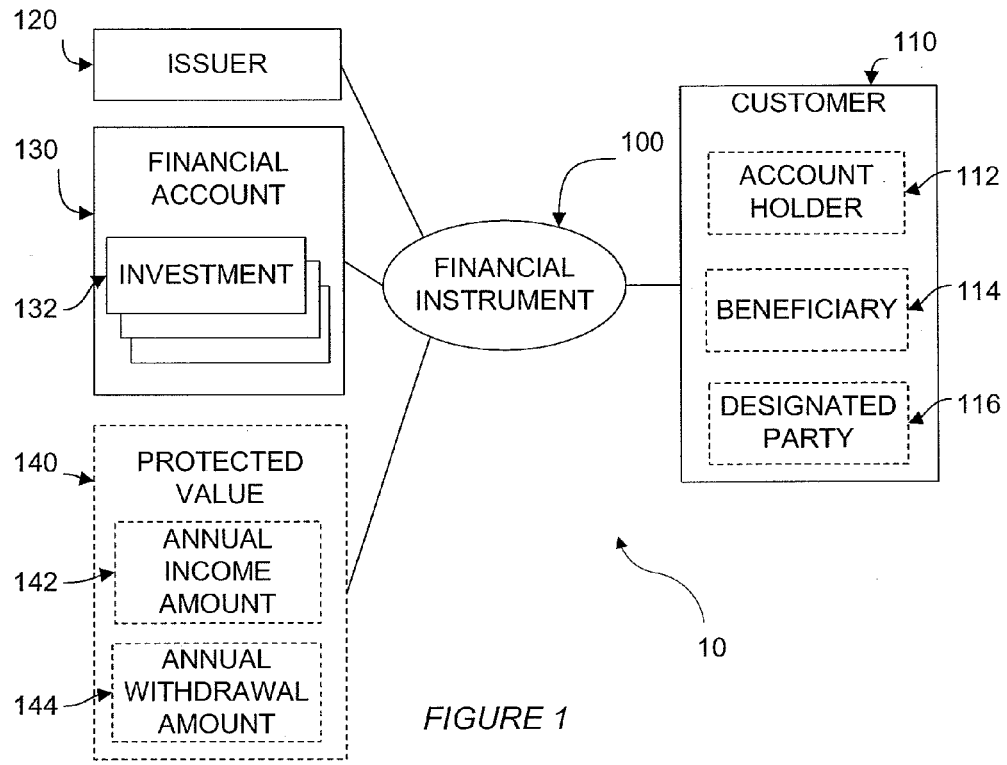
FIG. 1 illustrates a system for providing a financial instrument according to a particular embodiment of the present invention.

FIG. 1 illustrates a system 10 for providing financial instrument 100 according to a particular embodiment of the present invention. System 10 may interact with customer 110 and issuer 120; and system 10 may utilize financial account 130 and protected value 140. Financial instrument 100 may represent a contract between customer 110 and issuer 120. Financial instrument 100 may include certain provisions as described below in relation to FIG. 2.

According to certain embodiments, system 10 may be utilized to provide financial instrument 100 to customer 110, such that customer 110 may make a deposit and retain liquidity, while also receiving the benefit of a guarantee of lifetime payments and the security associated with a guaranteed growth rate.

Customer 110 may broadly refer to one or more of an account holder 112, a beneficiary 114, a designated party 116, and/or one who purchases financial instrument 100 for another person or entity. In certain embodiments, account holder 112 may represent a party who purchases financial instrument 100 and/or who is attributed as being an owner of financial account 130. In certain embodiments, account holder 112 may have one or more ownership rights in financial account 130. For example, account holder 112 may have the right to terminate financial instrument 100, to make investment decisions for financial account 130, to identify one or more beneficiaries 114, to identify one or more designated parties 116, and/or to make deposits into financial account 130. In a particular embodiment, account holder 112 may be the entity or entities who have tax liability for the transactions related to financial account 130. In certain embodiments, beneficiary 114 may represent a party who may receive payments and/or make withdrawals in accordance with the terms of financial instrument 100. In certain embodiments, designated party 116 may represent an individual, group of individuals, and/or other entity that may be designated for purposes of determining death benefits, lifetime payments, fees, guaranteed rates, expected liabilities, and/or other features of financial instrument 100. For example, guaranteed rates and/or fees may be determined based upon the age, gender, and/or health of designated party 116. As another example, the timing and/or amount of one or more asset transfers may be based upon the age, gender, and/or health of designated party 116. As yet another example, death benefit provisions may be based upon the death of designated party 116.

In certain embodiments, one or more of account holder 112, beneficiary 114, and designated party 116 may be the same party. In certain embodiments, financial instrument 100 may be purchased by account holder 112 for the benefit of beneficiary 114, with designated party 116 being the designated life for the guarantee of lifetime payments.

In certain embodiments, one or more of account holder 112, beneficiary 114, and designated party 116 may be related. For example, designated party 116 and beneficiary 114 may be related as husband and wife. As another example, account holder 112 may be an employer and an employee may be both beneficiary 114 and designated party 116. Alternatively, account holder 112 and beneficiary 114 may be the same individual or entity. In some embodiments, an employer might purchase financial account 130 for account holder 112. Also, financial instrument 100 may have multiple account holders 112, beneficiaries 114, and/or designated parties 116. For example, a husband and a wife may both be beneficiaries 114 and designated parties 116. As another example, two or more business partners could be designated parties 116. While this patent describes various actions, benefits, steps, etc. in relation to a customer 110, account holder 112, beneficiary 114, and/or designated party 116, those descriptions should not be construed as limiting because financial instrument 100 might provide for various persons to exercise control, take various actions, receive certain benefits, and/or affect certain features with regard to financial instrument 100.

Issuer 120 may represent an entity that provides and/or sells financial instrument 100 to customer 110. Issuer 120 may represent a bank, an insurance company, or other business entity engaged in the sale of one or more financial instruments. Issuer 120 may also represent multiple entities that operate together to provide or sell financial instrument 100.

Financial Account 130 may represent a principal balance including amounts deposited by customer 110 together with accrued growth due to a return on one or more investments. The value of financial account 130 may be distributed among one or more investments 132. Each investment 132 may provide a fixed or variable return, and the value of financial account 130 may be distributed among any combination of investments 132. For example, investment 132 may represent a municipal bond, a bond fund, a money market account, a corporate security, an index fund, a mutual fund, a real estate investment trust, hedges, swaps, derivatives, or any other appropriate type of investment. In certain embodiments, financial account 130 may include one or more investments 132 associated with multiple financial entities.

In certain embodiments, each investment 132 within financial account 130 may be selected by customer 110. In various embodiments, issuer 120 may restrict the investments 132 available to customer 110, require the value of financial account 130 to be distributed according to a specified asset allocation model, require customer 110 to participate in an asset transfer program, and/or allow customer 110 to accept certain limitations in exchange for other benefits. In certain embodiments, the composition of financial account 130 may change in response to one or more elections by customer 110 and/or in accordance with one or more provisions of financial instrument 100. In certain embodiments, the composition of financial account 130 (or one or more sub-accounts) may change based on (a) the amount of time elapsed since financial instrument 100 was issued and/or (b) the age, gender, and/or health of a designated party 116.

Financial account 130 may or may not be associated with issuer 120. In certain embodiments, the value of financial account 130 may be withdrawn in whole or in part at the discretion of customer 110.

Although guarantees are described herein as being provided by issuer 120, in some embodiments, a third party administering financial account 130 may contract with issuer 120 to provide one or more guarantees associated with financial instrument 100. For example, an insurance company might provide guarantees for mutual fund accounts or other types of financial accounts administered by issuer 120.

Protected value 140 represents a value all or a portion of which issuer 120 guarantees that beneficiary 114 will be able to receive. Protected value 140 may be based upon the value of financial account 130 at some point in time. In some embodiments, although financial account 130 may decrease due to market fluctuations, protected value 140 does not, thus providing a guaranteed rate of return regardless of market performance. In certain embodiments, protected value 140 may be based upon an initial deposit and the initial deposit may include an account balance from an existing contract. Thus, in some embodiments, the guarantees described herein may be added to existing financial instruments after the passage of time.

In certain embodiments, the amount and/or the guaranteed percentage of protected value 140 may vary based on certain characteristics of customer 110. For example, the guaranteed percentage of protected value 140 (or protected value 140 itself) may vary based upon the gender, age, and/or health status of one or more of account holder 112, beneficiary 114, and designated party 116. In certain embodiments, the amount and/or the guaranteed percentage of protected value 140 may vary depending upon whether and to what extent customer 110 accepts certain limitations on flexibility and/or control over financial account 130 and/or distributions therefrom. The amount available for withdrawal may also vary similarly.

In certain embodiments protected value 140 may be calculated at the time that financial instrument 100 is purchased, in other embodiments protected value 140 may be calculated on a periodic basis, and in still other embodiments protected value 140 may be calculated at the end of a certain period of time or upon the happening of a triggering event. In particular embodiments, protected value 140 may be calculated on a daily basis, at the end of each business day. In some embodiments, protected value 140 may be based upon a combination of factors and calculated at different times. Depending upon the embodiment, protected value 140 may become fixed at some point in time. For example, protected value 140 may become fixed at the time of the first discretionary withdrawal from financial account 130 by customer 110.

Numerous methods may be used to fix protected value 140 at some point in time. For example, protected value 140 may be calculated as equal to the value of financial account 130 at the time of the first withdrawal by customer 110. Alternatively, protected value 140 may be calculated as the highest value of financial account 130 at one or more specified times or at any time. For example, protected value 140 may be calculated as the highest value of financial account 130 on each of the first ten anniversaries of the purchase date.

In certain embodiments, protected value may be calculated as the greater of multiple calculation methods. In particular embodiments, protected value 140 may be calculated using one or more of various methods, but have a specified minimum value regardless of the calculated amount from these one or more methods. For example, protected value may be calculated as the value of financial account 130 on the date of first withdrawal or the highest value of financial account 130 on the first ten anniversary dates, but in no event less than the initial value of financial account 130 growing at a five percent annual growth rate for the first ten years.

In particular embodiments, protected value 140 may be calculated as the greater of protected value 140 at the end of the immediately preceding business day appreciated at a specified growth rate or the value of financial account 130. The specified growth rate may be fixed or variable. As one example, the specified growth rate may be fixed at a five-percent annual percentage rate. Further explanation of an example method for determining protected value 140, is included below in relation to FIG. 8.

In certain embodiments, protected value 140 may be calculated based upon the value of financial account 130 prior to the inclusion of any bonuses. Alternatively, in certain embodiments, protected value 140 may be calculated based upon the value of account value 130 with additional bonuses (or other incentives) added. For example, issuer 120 may pay a bonus to entice customers to purchase the guarantees discussed herein. The invention may include any method of determining protected value 140.

In certain embodiments, the amount and/or the guaranteed percentage of protected value 140 may change after it has been initially determined. As one example, the amount and/or guaranteed percentage of protected value 140 may change based upon changes in the law. As another example, the amount and/or guaranteed percentage of protected value 140 may change based upon an inflationary index, interest rate, or exchange rate. As yet another example, the amount and/or guaranteed percentage of protected value 140 may change based upon changes in the health of customer 110.

In certain embodiments, customer 110 may be allowed to step-up protected value 140 at specified times or at any time. For example, following an election to step-up protected value 140, protected value 140 may be set as equal to the current value of financial account 130. In a particular embodiment, customer 110 may elect to step-up protected value 140 at any time after the fifth anniversary of the first withdrawal, with additional step-ups being available five years after the date of the previous step-up election. A step-up in protected value 140 may require further deposits to financial account 130. In certain embodiments, protected value 140 may be automatically stepped-up on a periodic basis or upon the happening of particular events. For example, an automatic step-up of protected value 140 may occur on a daily, monthly, quarterly, or yearly basis.

In a particular embodiment, a step-up to protected value 140 may automatically occur on an annual basis after the first withdrawal, with protected value 140 being set as equal to the greatest of the value of financial account 130 on the previous quarterly anniversaries if that amount is greater than the current protected value 140. In alternative embodiments, monthly, bi-monthly, semi-annual, or any other appropriate anniversary may be used and automatic step-ups may occur on a semi-annual, quarterly, monthly, or any other appropriate basis.

In alternative embodiments, protected value 140 may be automatically stepped-up on a daily basis, with step-ups occurring every day or every business day. For example, on a daily basis protected value 140 may be stepped-up to equal the greater of the current value of financial account 130 and an amount equal to the previous day's protected value 140 growing at a specified annual growth rate, such as five percent per year. As another example, the daily step-up may be based on the greatest of three or more different calculation methods.

In certain embodiments, rather than setting protected value 140 as equal to the value of financial account 130 on a certain anniversary, protected value may be set as a percentage of such a value, as a certain value appreciated at a specified growth rate, or as any other appropriate value. In certain embodiments, the step-up value for protected value 140 may take into consideration any additional purchase payments, withdrawals, and adjustments to these purchase payments and withdrawals.

In certain embodiments, certain provisions of financial instrument 100 may be managed through the use of annual income amount 142 and/or annual withdrawal amount 144.

For example, a guarantee of lifetime payments may be managed by calculating annual income amount 142 and evaluating discretionary withdrawals in relation to annual income amount 142. For example if the cumulative withdrawals for a certain year exceed annual income amount 142, then annual income amount 142 may be reduced accordingly for future years. Similarly, one or more guarantees may be managed by calculating annual withdrawal amount 144 and evaluating discretionary withdrawals in relation to annual withdrawal amount 144. Further explanation of the operation of a certain embodiment with respect to protected value 140, annual income amount 142, and annual withdrawal amount 144 is included below in relation to FIGS. 6A and 6B.

In the operation of certain embodiments, customer 110 may purchase financial instrument 100 from issuer 120 (or an agent thereof). In certain embodiments, at the time that customer 110 purchases financial instrument 100, or at a later date, customer 110 may elect one or more available options associated with financial instrument 100. In some cases, the purchase of financial instrument 100 and/or the election of one or more available options may occur electronically. Issuer 120 may then create financial account 130. Issuer 120 may then associate one or more deposits made by customer 110 with financial account 130. In certain embodiments, customer 110 may make investment choices regarding the allocation of funds associated with financial account 130. Protected value 140 may be calculated using one or more specified calculation methods.

In some embodiments, following the purchase of financial instrument 100, customer 110 may make additional deposits to and/or discretionary withdrawals from financial account 130. Withdrawals from financial account 130 may or may not be required or allowed based upon the terms of financial instrument 100 and any elected options. The timing of withdrawals may or may not be regulated by financial instrument 100 and/or any elected options. In certain embodiments, withdrawals can be taken as separate partial withdrawals or as systematic withdrawals. For example, withdrawals may be automated and may be set up on a periodic basis by customer 110, issuer 120, or an agent thereof, with the period being yearly, quarterly, monthly, etc.

Although financial instrument 100 has been described as being purchased directly from issuer 120 in certain embodiments, financial instrument 100 may be purchased through one or more intermediaries.

Figure 2:
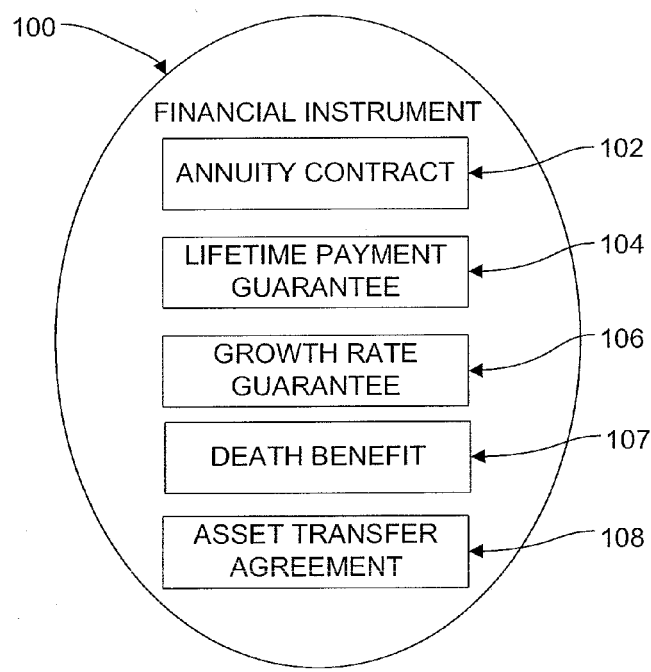
FIG. 2 illustrates a financial instrument according to a particular embodiment.

FIG. 2 illustrates a particular embodiment of financial instrument 100. In the embodiment shown, financial instrument 100 includes annuity contract 102, lifetime payment guarantee 104, growth rate guarantee 106, death benefit 107, and asset transfer agreement 108. Annuity contract 102 may represent a contract for a broad range of annuity products. For example, annuity contract 102 may represent a deferred variable annuity such as ANNUITY ONE 3 issued by PRUCO LIFE INSURANCE COMPANY. In certain embodiments, annuity contract 102 may represent a contract between customer 110 and issuer 120, wherein customer 110 may make one or more deposits and/or withdrawals during an accrual phase and then issuer 120 may make payments during a distribution phase. The transition from the accrual phase to the distribution phase may occur following an election by customer 110 to annuitize financial account 130.

In addition to the basic terms of annuity contract 102, financial instrument 100 may include additional provisions including lifetime payment guarantee 104, growth rate guarantee 106, death benefit 107, and asset transfer agreement 108. These additional provisions may be integrated provisions of financial instrument 100 or they may be included as electable options. Although annuity contract 102, lifetime payment guarantee 104, growth rate guarantee 106, death benefit 107, and asset transfer agreement 108 are shown as separate elements, one or more of these elements may be combined, and each of these elements may also include numerous components. In certain embodiments, different elements of financial instrument 100 may be purchased or elected at different times. For example, annuity contract 102 may be purchased in year one, and lifetime payment guarantee 104, growth rate guarantee 106, and asset transfer agreement 108, may be purchased or elected in year one or at anytime thereafter. In some embodiments, financial account 130 remains liquid and all or a portion of financial account 130 may be withdrawn (in some cases with penalty) by customer 110 prior to annuitization of annuity contract 102. Annuitization may or may not even occur depending upon the desires of customer 110.

In certain embodiments, lifetime payment guarantee 104 may include provisions guaranteeing that beneficiary 114 may receive financial transfers for life, beginning at or after a specified triggering event. For example, in certain embodiments, these financial transfers may be due to discretionary withdrawals and/or payments. In certain embodiments, the amount of (and/or a limit for) these financial transfers may be fixed or variable. For example, the amount of (and/or a limit for) these financial transfers may be determined based upon the age, gender, health status, and/or other morbidity factors for one or more individuals. As another example, the amount of (and/or a limit for) these financial transfers may be independent of such factors. In certain embodiments, the amount of (and/or the limit for) these financial transfers may change after a period of time according to a set schedule, changes in an external index, and/or any appropriate factor.

In certain embodiments, the amount of (and/or a limit for) these financial transfers may be determined based upon specified percentages of protected value 140. For example, the amount of (and/or a limit for) these financial transfers may be set at a first percentage for a certain period and then change to a second percentage for another period. In certain embodiments, these percentages may be fixed upon the effective date of lifetime payment guarantee 104, upon the date of a first financial transfer, or upon any other appropriate date.

In certain embodiments, lifetime payment guarantee 104 may guarantee that beneficiary 114 will receive no less than annual income amount 142 each year for the life of designated party 116, beginning with an event. In certain embodiments, annual income amount 142 may be five percent of protected value 140, but any percentage of any measured amount could be used. In certain embodiments, protected value 140 may be adjusted upwards or downwards based on certain events. For example, protected value 140 may be increased by additional deposits and may be decreased by cumulative withdrawals in a single year that exceed annual income amount 142.

In certain embodiments, in addition to or in lieu of lifetime payment guarantee 104, financial instrument 100 may include provisions guaranteeing that beneficiary 114 will receive financial transfers over a specified time period, such as a period of years, or a single financial transfer as a lump-sum payment or withdrawal.

In certain embodiments, growth rate guarantee 106 may include provisions allowing customer 110 to make withdrawals from financial account 130 based upon deposits made by customer 110. The provisions may further provide that the withdrawals may be made from a value that is guaranteed to grow at a specified fixed or variable rate for a specified period of time. For example, growth rate guarantee 106 may allow beneficiary 114 to make withdrawals from protected value 140, with protected value 140 guaranteed to be no less than the value of customer deposits growing at a fixed five percent per year for ten years from the date of the first deposit or until the date of the first withdrawal, whichever is sooner.

In certain embodiments, the specified rate for growth rate guarantee 106 may be any positive fixed value. In certain embodiments, the specified rate for growth rate guarantee 106 may be zero or a fixed negative value. In embodiments where the specified rate is zero or a fixed negative value, the beneficial aspects of growth rate guarantee 106 may include a reduction in risk for customer 110. In certain embodiments, the specified rate may be based on one or more variable indices. For example, the specified rate may be based on the Consumer Price Index, a stock market index, and/or the Federal Reserve's discount rate.

In certain embodiments, the specified rate may vary depending on the timing of deposits, the size of deposits, and/or the value of financial account 130. For example, different rates may apply to different deposits or the overall rate may be calculated based on the rates in effect at the time that deposits are made, weighted based on the relative size (or actual size) of the deposits. In certain embodiments, the specified rate may vary based on characteristics of account holder 112, beneficiary 114, and/or designated party 116. For example, the specified rate may vary depending on the gender, age, or health status of designated party 116.

In certain embodiments, the guaranteed growth may be set at a first rate for a specified period of time, or until a specified event occurs, and then change to a second rate. For example, the guaranteed growth rate may be zero for the first two years and then may change to a fixed five percent growth rate for the next eight years. In certain embodiments, the growth rate may change numerous times, with the changes occurring based upon specified periods of time and/or upon the occurrence of specified events.

In certain embodiments, the guaranteed growth rate may vary based on changes in market conditions. For example, the guaranteed growth rate may be tied to a change in a specified market index.

In embodiments of financial instrument 100 including death benefit 107, death benefit 107 may include provisions allowing for payments to be made to a recipient designated by account holder 112 and/or beneficiary 114, upon the death of designated party 116. For example, payments made under death benefit 107 may be made to beneficiary 114 upon the death of designated party 116, where designated party 116 is account holder 112. As another example, payments made under death benefit 107 may be made to an identified third party beneficiary upon the death of designated party 116 or beneficiary 114. Death benefit 107 may provide for payment of an amount based upon the value of financial account 130, protected value 140, or some other value identified in death benefit 107. For example, death benefit 107 may provide for payment in the amount of the value of financial account 130 at the time of death. As another example, death benefit 107 may provide for payment in the amount of the value of protected value 140 at the time of death. As yet another example, death benefit 107 may provide for payment in the amount of the highest value of financial account 130 on any anniversary of the effective date of financial instrument 100. In certain embodiments, death benefit 107 may provide for payment in the amount of the highest of multiple calculation methods. Although death benefit 107 has been illustrated and described as a separate element of financial instrument 100, death benefit 107 may be formed from multiple components and/or may be included as part of another element of financial instrument 100.

In embodiments of financial instrument 100 including asset transfer agreement 108, asset transfer agreement 108 may include provisions allowing for all or a portion of the value of financial account 130 to be transferred between sub-accounts or categories of investments 132. In certain embodiments, the transfer may be mandatory or at the discretion of issuer 120. In certain embodiments, the timing and the amount of the transfer may be determined based on one or more calculations, examples of which are described below. In certain embodiments, the use of asset transfer agreement 108 may serve to allow customer 110 to exercise some control over the distribution of assets within financial account 130, while at the same time mitigating the risk for issuer 120 associated with one or more guarantees associated with financial instrument 100.

In certain embodiments, the transfer performed in accordance with asset transfer agreement 108 may occur in response to one or more triggering events, including, for example, events related to one or more investments 132 and/or financial account 130. Example triggering events may include a drop in the value of financial account 130 (or one or more investments 132) below a specified threshold (such drop being the result of a change in the value, a change in the threshold, or a combination thereof); a decrease in the value of financial account 130 (or one or more investments 132) at a rate greater than a specified threshold rate, a change in one or more credit ratings associated with one or more entities associated with the one or more investments 132, or a change in a calculated risk associated with financial account 130 (or one or more investments 132).

Figure 3A:
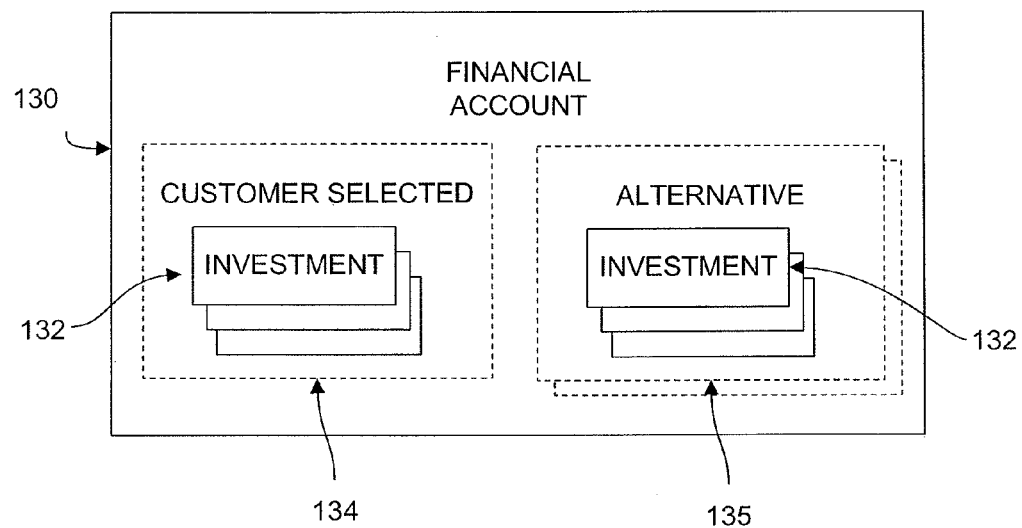
FIGS. 3A and 3B illustrate example asset distributions within a financial account.
Figure 3B:
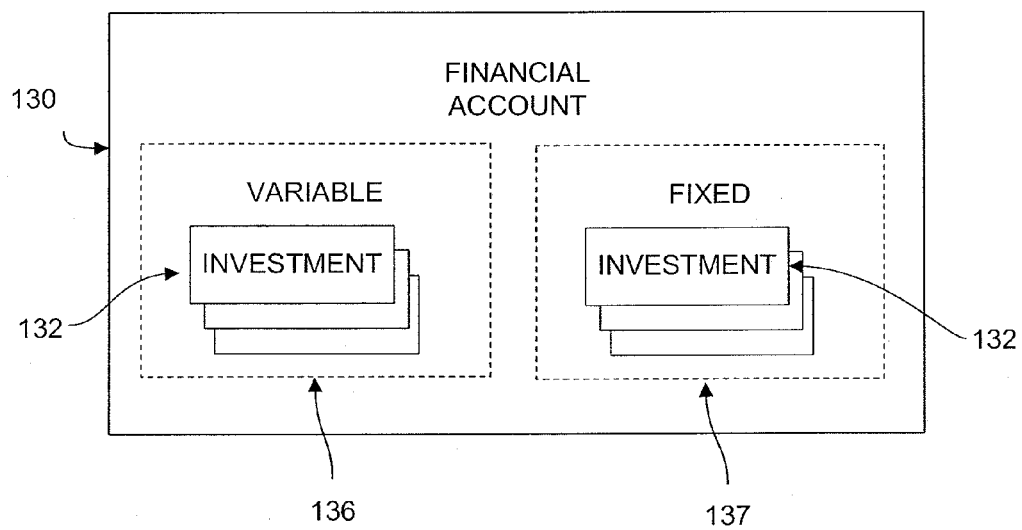

In certain embodiments, in response to one or more triggering events, all or a portion of the value of financial account 130 may be transferred between one or more sub-accounts or categories of investments 132. FIGS. 3A and 3B illustrate example distributions of assets among multiple sub-accounts or categories of investments 132, according to particular embodiments.

As shown in FIG. 3A, in certain embodiments, financial account 130 may be distributed among customer selected investments 134 and alternative investments 135. Customer selected investments 134 may represent a sub-account or category of investments 132 selected by customer 110. Customer selected investments may be variable and/or fixed return investments. Alternative investments 135 may represent a sub-account or category of investments 132 into which all or a portion of the value of customer selected investments 134 may be transferred, in accordance with one or more provisions of asset transfer agreement 108. In certain embodiments, alternative investments 135 may include one or more investments 132 that lower the risk or expected variability of financial account 130.

In certain embodiments, alternative investments 135 may include low risk or fixed return investments 132. In certain embodiments, alternative investments 135 may include one or more investments 132 having a non-correlated risk with respect to one or more customer selected investments 134. In particular embodiments, alternative investments 135 may include one or more investments 132 having a negative or inverse risk correlation with respect to one or more customer selected investments 134. In certain embodiments, alternative investments 135 may include high-leverage or option-type investments, such as puts or calls. In certain embodiments, through the use of alternative investments 135, financial instrument 130 may display self-hedging characteristics.

In certain embodiments, alternative investments 135 may be identified by the provisions of financial instrument 100 or selected by issuer 120, an agent of issuer 120, or a third party.

In certain embodiments, alternative investments 135 may be selected by customer 110 from a particular group of investments 132. For example, issuer 120 may identify a particular group of investments 132 from which customer 110 may choose.

In certain embodiments, asset transfer agreement 108 may provide for a multi-tier approach. For example, a first triggering event may lead to a first transfer of an amount from customer selected investments 134 to a first group of alternative investments 135. Then, a second triggering event may lead to a second transfer of an amount from customer selected investments 134 to the first group of alternative investments 135, from the first group of alternative investments 135 to a second group of alternative investments 135, or some combination thereof. In a particular embodiment, the first group of alternative investments 135 may be selected based on their inverse correlation with customer selected investments 134 and the second group of alternative investments 135 may be selected based on their low risk nature. For example, the second group of alternative investments 135 may be limited to one or more fixed return investments.

As shown in FIG. 3B, in certain embodiments, all or a portion of financial account 130 may be distributed among variable investments 136 and fixed investments 137. Variable investments 136 may represent a particular embodiment of customer selected investments 134. For example, variable investments 134 may include one or more investments 132 selected by customer 110 according to the provisions of financial instrument 100. Similarly, fixed investments 137 may represent a particular embodiment of alternative investments 135. For example, fixed investments may represent one or more investments 132 all or a portion of the value of variable investments 136 may be transferred; in accordance with one or more provisions of asset transfer agreement 108. Although both variable investments 136 and fixed investments 137 may include variable and/or fixed return investments 132, the combined risk and expected rate of return for fixed investments 137 are lower than the combined risk and expected rate of return for variable investments 136.

Although fixed investments 137 may include one or more variable income investments, in certain embodiments, fixed investments 137 may be limited to one or more fixed income investments, such as municipal bonds, bond funds, and money market accounts. In certain embodiments, the composition of fixed investments 137 may change from time to time.

In embodiments utilizing variable investments 136 and fixed investments 137, the timing and/or amount of a transfer between these investments may be determined based on the calculation of a liability ratio "R", which may be further based on an expected liability "L". In a particular embodiment, the expected liability "L" may be calculated based on the attained age and/or the issuing age of the designated party and the expected periodic payments for which issuer 120 may be liable. For example, in embodiments in which financial instrument 100 includes lifetime payment guarantee 104, the expected liability "L" may be calculated as follows:

$$L = I_P * Q_{IA:AA} * a/12$$

where "$I_P$" is the projected annual income amount; "$Q_{IA:AA}$" is an age-based factor; and "a" is an annuity factor. In certain embodiments, prior to a first withdrawal, the projected annual income amount "$I_P$" is equal to the annual income amount 142 that would be in place if the first withdrawal were to occur on the date of the calculation. In certain embodiments, subsequent to the first withdrawal, the projected annual income amount "$I_P$" is equal to the greater of annual income amount 142 and the expected annual income amount 142 taking into account available information about future automatic or elected step-ups. Further explanation of an example method for calculating a projected annual income amount "$I_P$" according to particular embodiments of financial instrument 100 is included below in relation to FIG. 9.

FIGS. 4A and 4B illustrate tables 200 and 250 providing example age-based factor values 212, according to particular embodiments. As shown in FIG. 4A, table 200 illustrates example age-based factor values 212 for financial instrument 100 (or a guarantee associated with financial instrument 100) issued when designated party 116 is 55 years old. Table 200 provides different age-based factor values 112 in columns 204 and 208 for the different attained ages 210 in columns 202 and 206 associated with the current attained age 210 of designated party 116. Similarly, as shown in FIG. 4B, table 250 illustrates example age-based factor values 212 for financial instrument 100 (or a guarantee associated with financial instrument 100) issued when designated party 116 is 60 years old. Table 250 provides different age-based factor values 112 in columns 254 and 258 for the different attained ages 210 in columns 252 and 256 associated with the current attained age 210 of designated party 116.

Although example age-based factors values 112 have been illustrated with example tables 200 and 250 as being based on the age of designated party 116, in alternative embodiments, age-based factor values 112 may be based on the age of different parties, multiple parties, and/or upon additional criteria. Although tables 200 and 250 provide example age-based factor values 112, any appropriate age-based factor values 112 may be used to customize the management of asset transfer agreement 108 according to, for example, various actuarial calculations and/or assumptions.

FIG. 5 illustrates table 300 providing example annuity factor values 322, according to particular embodiments. As shown in FIG. 5, table 300 illustrates example annuity factors 322 for financial instrument 100 (or a guarantee associated with financial instrument 100). Each annuity factor value 322 provided in table 200 is associated with a current attained age for designated party 116. Table 300 provides actuarial factors 322, broken down by years in rows 320 and then further by months in columns 310. For example, in the embodiment shown, the annuity factor for a particular designated party 116 who is currently fifty-seven years and one month old is 222.68, as indicated in column 310(b).

Although example annuity factor values 322 have been illustrated with example table 300 as being based on the age of designated party 116, in alternative embodiments, annuity factor values 322 may be based on the age of different parties, multiple parties, and/or upon additional criteria. Although table 300 provides example annuity factor values 322, any appropriate annuity factor values 322 may be used to customize the management of asset transfer agreement 108 according to, for example, various actuarial calculations and/or assumptions.

In a particular embodiment, the comparison of the current value of financial account 130 to the expected liability "L" may utilize the following formula:

$$R = (L-F)/V$$

where "R" is the liability ratio; "L" is the expected liability; "F" is the current value of fixed investments 137; and "V" is the current value of variable investments 136.

In certain embodiments, if "R" is greater than an upper limit "$R_U$" then all or a portion of the current value "V" of variable investments 136 will be transferred to fixed investments 137. Similarly, in certain embodiments, if liability ratio "R" is less than a lower limit "$R_L$" and fixed investments 137 has a non-zero balance, then all or a portion of the current value "F" of fixed investments 137 will be transferred to variable investments 136. For example, in order to achieve a target liability ratio "$R_T$", when liability ratio "R" is greater than the upper limit, a transfer amount "T" will be transferred from variable investments 136 to fixed investments 137. In certain embodiments, transfer amount "T" may be calculated as follows:

$$T=\{\text{Min}(V,[L-F-V^*R_T]/(1-R_T))\}$$

Similarly, in certain embodiments, transfer amount "T" from fixed investments 137 to variable investments 136 may be calculated as follows:

$$T=\{\text{Min}(F,[L-F-V^*R_T]/(1-R_T))\}$$

Further explanation of a method for processing an asset transfer pursuant to asset transfer agreement 108, included in certain embodiments of financial instrument 100, is included below in relation to FIG. 7.

In embodiments of financial instrument 100 including annuity contract 102, lifetime payment guarantee 104, and growth rate guarantee 106, annuitization may occur due to an election to annuitize or the terms of annuity contract 102 may require annuitization on or before a certain date or triggering event. In certain embodiments, upon annuitization, customer 110 may be provided with multiple annuitization options. For example, customer 110 may be provided with periodic payments for life, with the amount of the payments based in part upon the value of financial account 130 at the time of annuitization. As another example, customer 110 may be provided with periodic payments for an established period, with the amount of the payments based in part upon the value of financial account 130. Alternatively, customer 110 may be provided with periodic payments for life in an amount equivalent to annual income amount 142 or customer 110 may be provided with periodic payments in an amount equivalent to the annual withdrawal amount 144 for a period of time extending until protected value 140 is exhausted. In certain embodiments, upon annuitization, the benefits associated with lifetime payment guarantee 104 and growth rate guarantee 106 may be terminated.

In certain embodiments, financial instrument 100 may provide for an option allowing customer 110 to elect to receive the present value of future guaranteed payments. For example, in embodiments where the charge for lifetime payment guarantee 104 is an up-front charge, financial instrument 100 may allow for customer 110 to cancel lifetime payment guarantee 104 and receive a payment calculated based upon the present value of the guarantee. In these embodiments, the calculation may or may not include an underwriting assessment of the life expectancy of beneficiary 114.

Although, in the embodiment shown, financial instrument 100 includes annuity contract 102, in other embodiments financial instrument 100 may include any other appropriate forms of investment contracts. For example, financial instrument 100 may include a mutual fund contract, a funding agreement, a 401(k) contract, and/or an individual retirement account contract in addition to, or in lieu of, annuity contract 102.

In certain embodiments, financial instrument 100 may be offered (or sold) as an investment contract (such as annuity contract 102) with a variety of options available for election by customer 110. In certain embodiments, these options may include lifetime payment guarantee 104, growth rate guarantee 106, death benefit 107, and asset and/or asset transfer agreement 108, among others. The present invention is intended to cover such embodiments, whether or not such available options are elected by customer 110.

The costs associated with each element of financial instrument 100 may be assessed together or as separate charges, and the charges may be assessed in different ways. For example, the costs may be assessed as up-front charges, as asset charges, or as charges against withdrawals or payments. In certain embodiments, the costs may be charged periodically and/or may vary over time. For example, there may be no charge for a period of time and/or the charge may increase or decrease over time depending on a variety of factors. In certain embodiments, the costs may be charged in a manner such that the charge is assessed pro-rata over multiple investments or financial accounts 130, according to an election by customer 110, and/or such that the tax consequences of the charge are substantially minimized. In a particular embodiment, the charge for each element is assessed as a daily asset charge against the value of financial account 130 or variable investments 136. For example, the charge assessed for lifetime payment guarantee 104 and growth rate guarantee 106 may be a sixty basis point charge (0.60 percent per year) assessed against the daily balance of variable investments 136 within financial account 130. Similarly, the charge assessed for death benefit 107 may be a 140 basis point charge (1.40 percent per year) assessed against the daily balance of variable investments 136 within financial account 130.

As indicated above, in certain embodiments, financial instrument 100 may provide for multiple beneficiaries 114 and financial instrument 100 may provide for various persons to exercise control. For example, financial instrument 100 may provide that both a husband and a wife are beneficiaries 114 and designated parties 116. Financial instrument 100 may further provide that the husband may make discretionary withdrawals from financial account 130 and, if the husband pre-deceases the wife, that the wife may make discretionary withdrawals from financial account 130 after the husband's death or the wife may continue as account holder 112 of financial instrument 100. Additionally, financial instrument 100 may further provide that if account value 130 reaches zero during the husband's life, then the husband may receive periodic payments for life and then, upon his death, the wife may receive periodic payments for her life. In certain embodiments, financial instrument 100 may include similar provisions for business partners or other arrangements involving multiple beneficiaries 114 and/or designated parties 116.

Figure 6A:
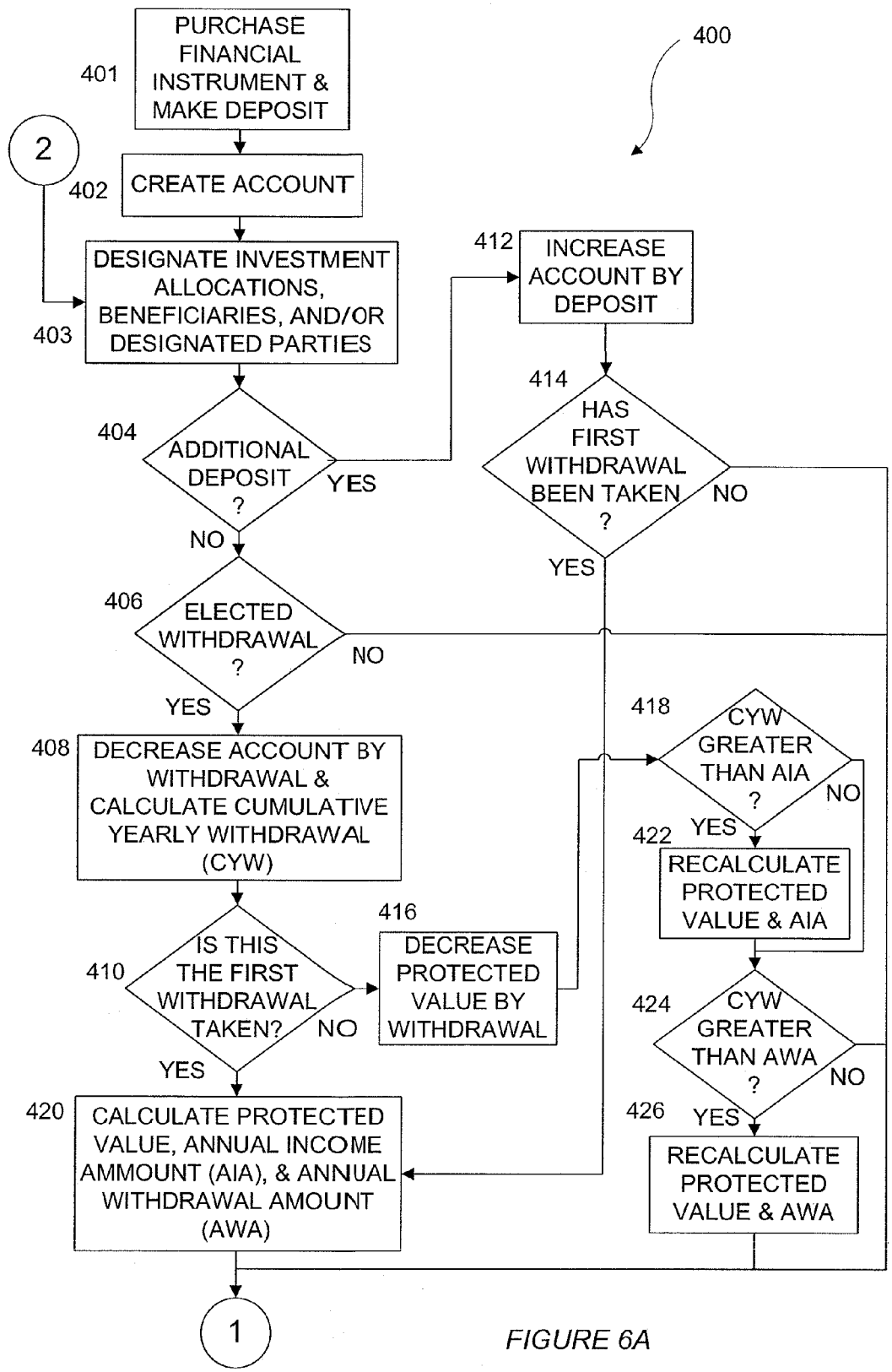
FIGS. 6A and 6B provide a flowchart illustrating the operation of a financial instrument according to a particular embodiment.
Figure 6B:
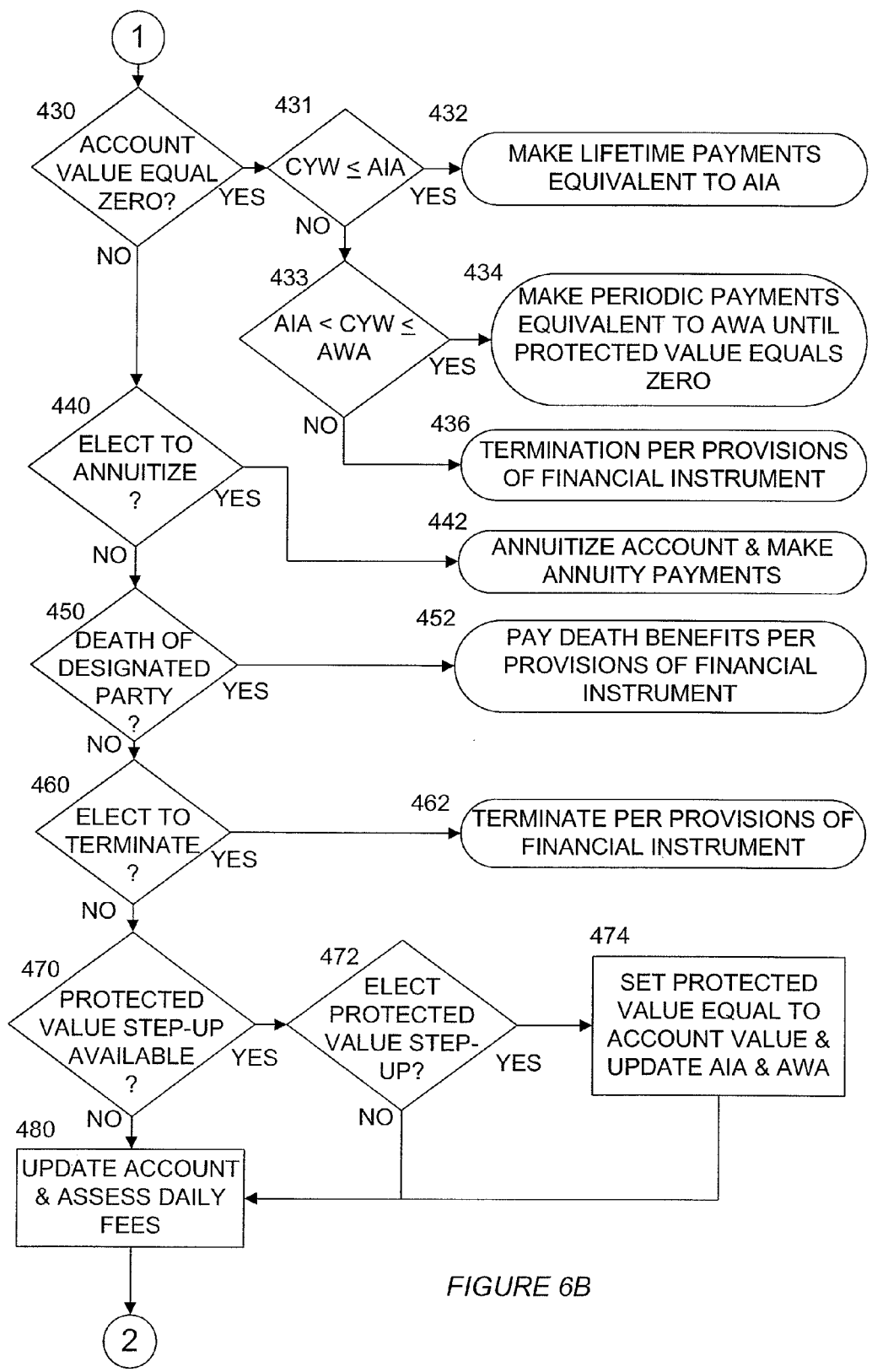

FIGS. 6A and 6B provide flowchart 400 which illustrates the operation of financial instrument 100 according to a particular embodiment. Flowchart 400 traces a few of the possible scenarios that are available to customer 110 following the purchase of an embodiment of financial instrument 100. Flowchart 400 is intended to demonstrate an embodiment of financial instrument 100 in which certain features of financial instrument 100 are paid for on a daily basis through the use of a daily fee assessment, assessed on a daily basis against the value of all or a portion of financial account 130. Accordingly, although in certain embodiments more than one of the elected actions identified in flowchart 400 may be taken on the same day, flowchart 400 assumes that only one elected action will be taken for any given day.

According to flowchart 400, at step 401, customer 110 may make one or more initial deposits and purchase financial instrument 100. At this time, customer 110 may elect one or more available options, including lifetime payment guarantee 104 and growth rate guarantee 106. In certain embodiments, the value of financial account 130 may include one or more bonus payments or credits applied at the time that financial instrument 100 is purchased and/or at one or more times during the term of financial instrument 100. At step 402, financial account 130 is created. Customer 110 may designate investment allocations for financial account 130, one or more beneficiaries 114, and/or one or more designated parties 116, at step 403. If additional deposits are made by customer 110, at step 404, then the value of financial account 130 is increased by the amount of the additional deposits, at step 412. In some cases, a fee may be deducted from the additional deposits. If an elected withdrawal is taken at step 406, then the value of financial account 130 is decreased by the amount of the withdrawal and the cumulative yearly withdrawal is calculated at step 408. In certain embodiments, the cumulative yearly withdrawal may be the total of all withdrawals made during the particular calendar, fiscal, or contract year. If the withdrawal is the first withdrawal taken in relation to financial instrument 100, at step 410, then protected value 140, annual income amount 142, and annual withdrawal amount 144 are calculated at step 420. Similarly, if additional deposits are made by customer 110 at step 404 and the first withdrawal has already been taken at step 414, then protected withdrawal 140, annual income amount 142, and annual withdrawal amount 144 are calculated at step 420. In some embodiments, the additional deposits may not change some or all of these values. If the withdrawal is not the first withdrawal taken in relation to financial instrument 100, at step 410, then protected value 140 is decreased by the amount of the withdrawal at step 416. If the cumulative yearly withdrawal exceeds annual income amount 142, at step 418, then protected value 140 and annual income amount 142 are recalculated at step 422. If the cumulative yearly withdrawal exceeds annual withdrawal amount 144, at step 424, then protected value 140 and annual withdrawal amount 144 are recalculated at step 426. These and other calculations are discussed in more detail below.

If the value of financial account 130 is equal to zero, at step 430, then there may be multiple possible alternative outcomes. If the value of financial account 130 is equal to zero at step 430 and cumulative yearly withdrawals are less than or equal to annual income amount 142 at step 431, then lifetime benefit payments may be made to customer 110 in an amount equivalent to annual income amount 142, at step 432. If the value of financial account 130 is equal to zero at step 430 and cumulative yearly withdrawals are greater than annual income amount 142 but less than or equal to annual withdrawal amount 144 at step 433, then beneficiary 114 may have withdrawals in an amount equivalent to annual withdrawal amount 144 until protected value 140 equals zero, at step 434. If the value of financial account 130 is equal to zero at step 430 and cumulative yearly withdrawals are greater than annual withdrawal amount 144, then financial instrument 100 may be terminated in accordance with the provisions of financial instrument 100, at step 436.

If financial instrument 100 includes annuity contract 102 and customer 110 elects to annuitize, at step 440, then financial account 130 is annuitized and annuity payments are made pursuant to the provisions of annuity contract 102, at step 442. Financial account 130 may cease to exist at this point and its balance may no longer be able to be withdrawn by customer 110. If financial instrument 100 includes death benefit 107 and if customer 110 dies, at step 450, then payments are made pursuant to the provisions of death benefit 107, at step 452. If customer 110 elects to terminate one or more provisions of financial instrument 100, at step 460, then those provisions are terminated in accordance with the terms of financial instrument 100, at step 462.

If a step-up for protected value 140 is available at step 470 and if customer 110 elects a step-up for protected value 140 at step 472, then protected value 140 is set as equal to the current value of financial account 130 and annual income amount 142 and annual withdrawal amount 144 are updated, at step 474. In some embodiments, step 472 may be omitted and the step up may be automatic. Financial account 130 may be updated to reflect daily changes in investments and daily fees may be assessed against financial account 130, at step 480.

The calculations identified in flowchart 400 are dependent upon the particular features of financial instrument 100. Included below are example calculations for particular embodiments of financial instrument 100. In the example calculations described below, financial instrument 100 is treated as including annuity contract 102, lifetime payment guarantee 104, and growth rate guarantee 106. For the purpose of these calculations, annuity contract 102 is treated as a deferred variable annuity, growth rate guarantee 106 is treated as a guarantee of a five percent growth rate for the first ten years, and lifetime payment guarantee 104 is treated as a guarantee of five percent payments for life. Unless otherwise indicated, it will be assumed that financial instrument 100 was purchased with an initial deposit and no additional deposits have been made. Also, unless indicated otherwise, all interest is assumed to be compounded daily.

Each time that a withdrawal is made, the value of financial account 130 may be reduced by the amount of the withdrawal. In one embodiment, on the date of the first withdrawal, protected value 140 may be set at the greater of the current value of financial account 130 or the initial value of financial account 130 growing at five percent per year compounded. Using these assumptions, on the date of the first withdrawal, annual income amount 142 may be set at five percent of protected value 140 at the time that protected value 140 is initially determined. Similarly, annual withdrawal amount 144 may be set at seven percent of protected value 140 at the time that protected value 140 is initially determined. In particular embodiments, the percentages and/or methods of determining annual withdrawal amount 144 or annual income amount 142 may vary.

For example, suppose an initial deposit of $100,000 is made on Apr. 1, 2005. The first withdrawal takes place on Feb. 1, 2006 when the value of financial account 130 is equal to $102,500. Protected value 140 would initially be calculated as the greater of $102,500 or $104,175.

$$\$100,000 \times (1.05)^{(306/365)} = \$104,175$$

Thus, protected value 140 would be $104,175. After the initial protected value 140 is calculated, the withdrawal amount may be subtracted from financial account 130 and protected value 140. Accordingly, based on the assumptions above, annual income amount 142 would initially be $5,209.

$$\$104,175 \times 0.05 = \$5,209$$

Similarly, annual withdrawal amount 144 would initially be $7,292.

$$\$104,175 \times 0.07 = \$7,292$$

If the cumulative withdrawals in a given year exceed annual income amount 142, protected value 140 and annual income amount 142 are recalculated. Suppose that the current value of financial account 130 is $55,000 and annual income amount 142 is $5,000. The first withdrawal during the applicable year is $7,000, which is $2,000 greater than annual income amount 142. The first step in the calculation would be to subtract annual income amount 142 from the current value of financial account 130. Thus, the value of financial account 130 would be reduced to $50,000. ($55,000−$5,000=$50,000) The next step is to calculate the new annual income amount 142. Annual income amount 142 would decrease according to the percentage of the excess amount to the value of financial account 130 prior to the excess being deducted. Thus, annual income amount 142 would drop to $4,800 for subsequent years.

(1−($2,000/$50,000))×$5,000=$4,800

The excess withdrawal amount would then be subtracted from the value of financial account 130. Thus, after the withdrawal, the value of financial account 130 would be $48,000. Protected value 140 would similarly be reduced by the amount of the $7,000 withdrawal.

If the cumulative withdrawals in a given year exceed annual withdrawal amount 144, protected value 140 and annual withdrawal amount 144 are recalculated. Suppose that the current value of financial account 130 is $58,000 and annual withdrawal amount 144 is $8,000. The first withdrawal during the applicable year is $12,000, which is $4,000 greater than annual withdrawal amount 144. The first step in the calculation would be to subtract annual withdrawal amount 144 from the current value of financial account 130. Thus, the value of financial account 130 would be reduced to $50,000. ($58,000−$8,000=$50,000) The next step is to calculate the new annual withdrawal amount 144. Annual withdrawal amount 144 would decrease according to the percentage of the excess amount to the value of financial account 130 prior to the excess being deducted. Thus, annual withdrawal amount 144 would drop to $7,360 for subsequent years.

(1−($4,000/$50,000))×$8,000=$7,360

The excess withdrawal amount would then be subtracted from the value of financial account 130. Thus, after the withdrawal, the value of financial account 130 would be $46,000. Protected value 140 would similarly be reduced by the amount of the $12,000 withdrawal.

In certain embodiments, withdrawals that reduce the value of financial account 130 below a specified minimum amount will not be allowed if they are greater than the annual income amount. In certain embodiments, provisions in financial instrument 100 may allow for exceptions to accommodate certain provisions of the tax code. For example, if financial instrument 100 is subject to required minimum distributions under the tax code, then financial instrument 100 may provide that required withdrawals will not reduce annual income amount 142.

Each time that an additional deposit is made, the value of financial account 130 may be increased by the amount of the deposit. If a withdrawal has been made prior to the additional deposit, then protected value 140 may also be increased by the amount of the additional deposit, annual income amount 142 may be increased by five percent of the additional deposit, and annual withdrawal amount 144 may be increased by seven percent of the additional deposit. For example, suppose protected value 140 is $50,000, annual withdrawal amount 144 is $7,000, and annual income amount is $5,000. If customer 110 makes an additional deposit of $42,400, then protected value 140 would increase to $92,400. ($50,000+$42,400=$92,400). Annual withdrawal amount 144 would increase to $9,968.

($42,400×0.07)+$7,000=$9,968

Annual income amount 142 would increase to $7,120.

($42,400×0.05)+$5,000=$7,120

Again, the percentages may vary and the ability to make deposits may be controlled. Some contracts may have annual withdrawal amount 144 only or annual income amount 142 only.

If financial instrument 100 provides for elected step-ups to protected value 140, during periods when step-ups are allowed customer 110 may elect to step-up protected value 140 to equal the value of financial account 130 (or some proportional amount). If such a step-up is elected, annual income amount 142 may be set at the greater of its current value or five percent of the new protected value 140. Similarly, if such a step-up is elected, annual withdrawal amount 144 may be set at the greater of its current value or seven percent of the new protected value 140. For example, suppose the value of financial account 130 is $80,000, protected value 140 is $60,000, annual withdrawal amount 144 is $7,000, and annual income amount 142 is $3,500. If a step-up is elected, protected value 140 would be set at $80,000, and annual income amount 142 would be set at $4,000. ($80,000×0.05=$4,000). Annual withdrawal amount 144 would remain the same, because seven percent of protected value 140 ($80,000×0.07=$5,600) is less than annual withdrawal amount 144 ($7,000).

Figure 7:
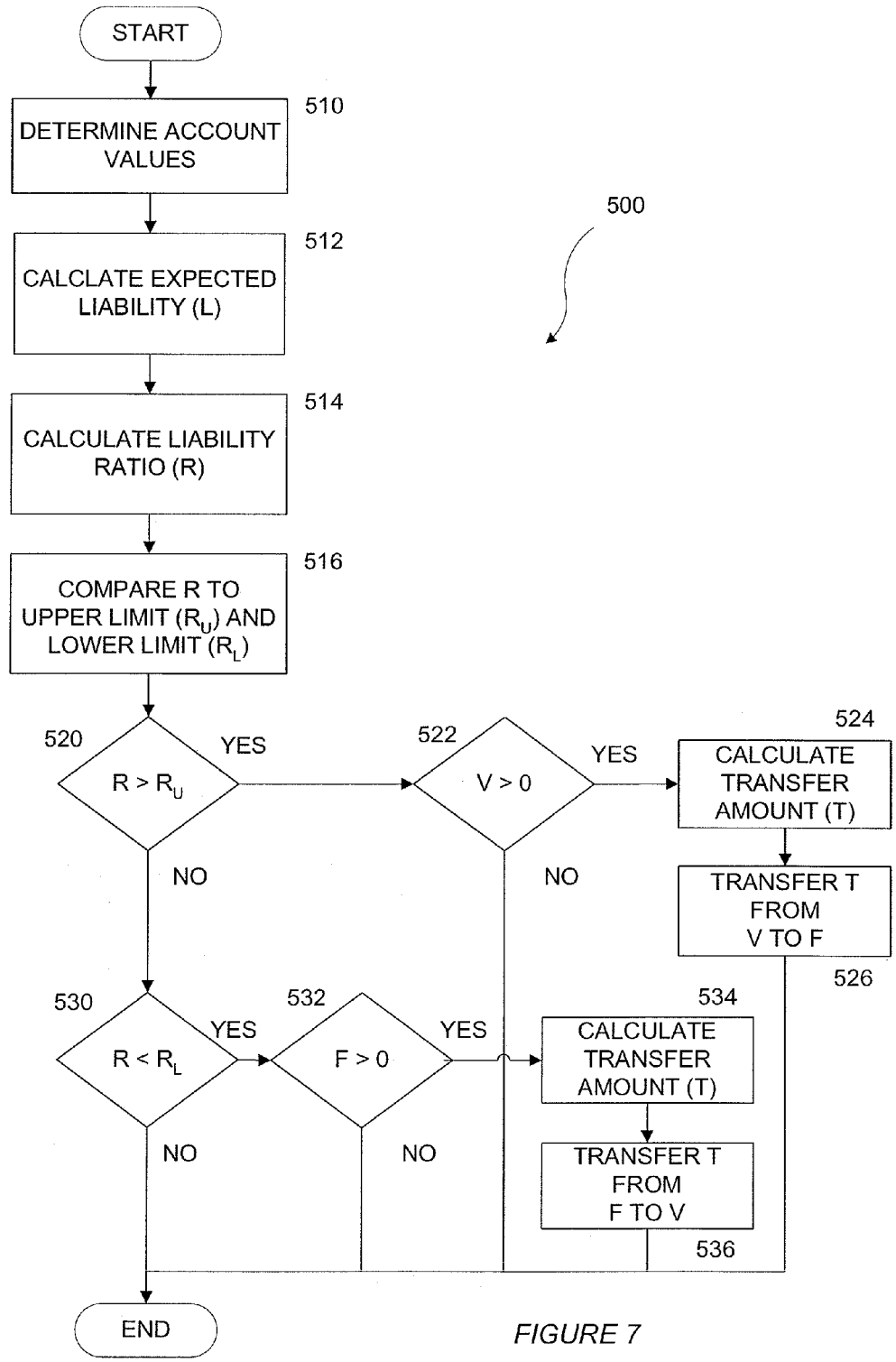
FIG. 7 provides a flow chart illustrating an example method for processing an asset transfer.

FIG. 7 provides a flow chart illustrating an example method 500 for processing an asset transfer according to an example embodiment of financial instrument 100 including asset transfer agreement 108. At step 510, investment values are determined. In certain embodiments, investment values may be determined for financial account 130, which may include variable investments 136 and/or fixed investments 137. At step 512, expected liability "L" is calculated. At step 514, a liability ratio "R" is calculated. In certain embodiments, expected liability "L" and liability ratio "R" may be calculated in a manner discussed above with respect to FIGS. 2-5. At step 516, liability ratio "R" is compared to an upper limit "$R_U$" and a lower limit "$R_L$". In a particular embodiment, as just one example, upper limit "$R_U$" may be equal to eighty-five percent and lower limit "$R_L$" may be equal to seventy-five percent, with a target liability ratio "$R_T$" equal to eighty percent. If at step 520 it is determined that liability ratio "R" is greater than upper limit "$R_U$" and at step 522 it is determined that variable investment value "V" is greater than zero, then at step 524 transfer amount "T" is calculated and at step 526 transfer amount "T" is transferred from one or more variable investments 136 to one or more fixed investments 137. In a particular embodiment, asset transfers from multiple variable investments 136 may be performed on a pro-rata basis. If at step 530 it is determined that liability ratio "R" is less than lower limit "$R_L$" and at step 532 it is determined that fixed investment value "F" is greater than zero, then at step 534 transfer amount "T" is calculated and at step 536 transfer amount "T" is transferred from one or more fixed investments 137 to one or more variable investments 136. In a particular embodiment, asset transfers from one or more fixed investments 137 will be performed on a last-in-first-out (LIFO) basis and asset transfers into multiple variable investments 136 will be performed on a pro-rata basis.

Figure 8:
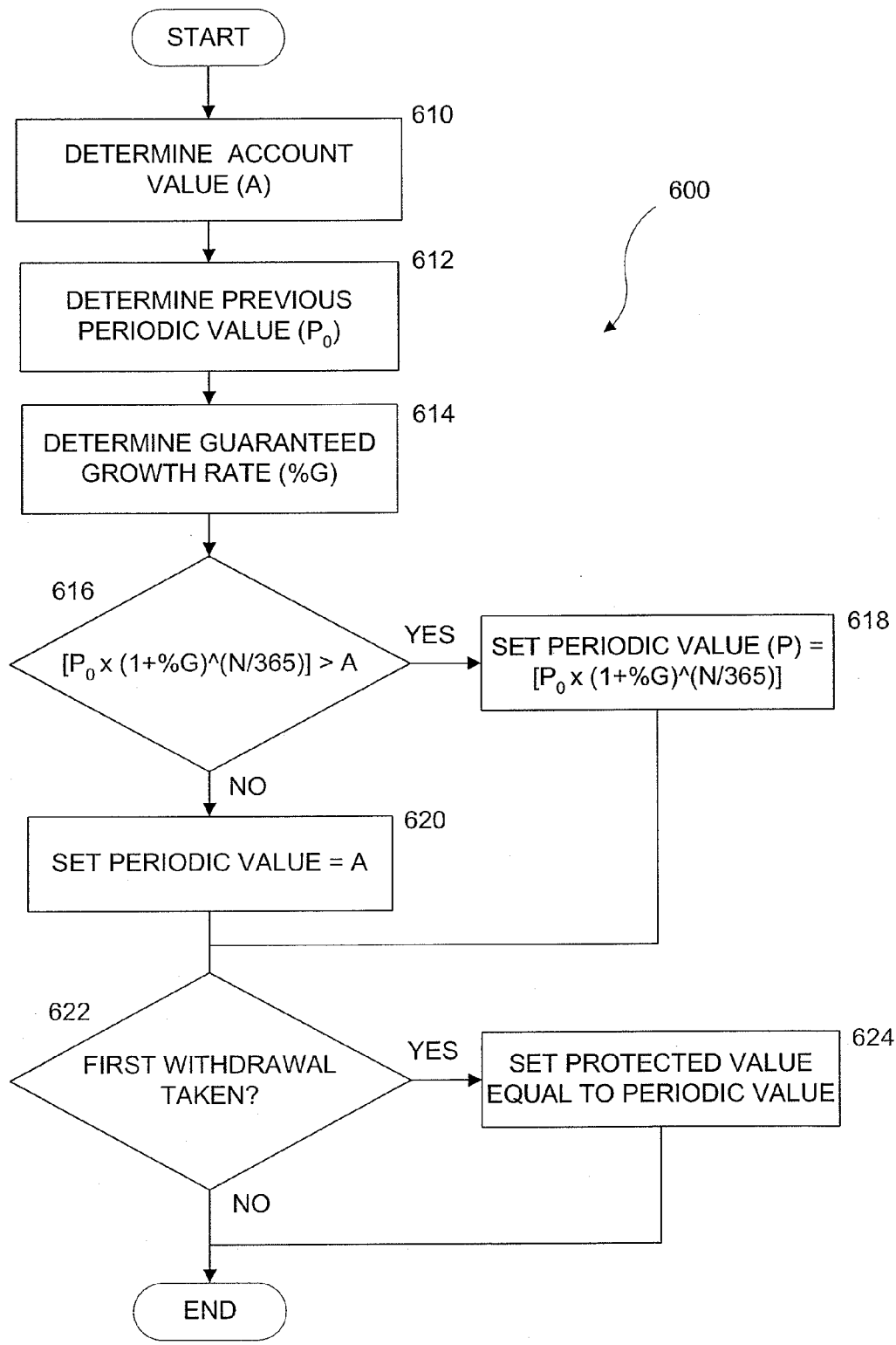
FIG. 8 provides a flow chart illustrating an example method for determining a protected value.

FIG. 8 provides a flow chart illustrating an example method 600 for determining protected value 140 according to particular embodiments of financial instrument 100. In certain embodiments, method 600 may be performed on a scheduled periodic basis, with the period being daily, weekly, monthly, quarterly, yearly, or any other appropriate period. In certain embodiments, method 600 may be performed at the end of each business day. In the particular embodiment described below, method 600 is assumed to be performed at the end of each business day and protected value 140 is assumed to be calculated on the date of the first withdrawal.

At step 610, account value "A" is determined. In certain embodiments, account value "A" may represent all or a portion of financial account 130, which may or may not include one or more variable investments 136 and/or one or more fixed investments 137. At step 612, the previous periodic value "$P_O$" is determined. In certain embodiments, the previous periodic value "$P_O$" represents the value of the periodic value as determined at the end of the previous period. At step 614, guaranteed growth rate "% G" is determined. In certain embodiments, guaranteed growth rate "% G" may be associated with growth rate guarantee 106.

If at step 616, the previous periodic value "$P_O$" increased according to the guaranteed growth rate "% G" is determined to be greater than account value "A", then at step 618, periodic value "P" is set as equal to the previous periodic value "$P_O$" increased according to the guaranteed growth rate "% G". If at step 616, the previous periodic value "$P_O$" increased according to the guaranteed growth rate "% G" is determined to be less than or equal to account value "A", then at step 620, periodic value "P" is set as equal to account value "A". In certain embodiments, the previous periodic value "$P_O$" increased according to the guaranteed growth rate "% G" may be calculated using the following formula:

$$P = P_O \times (1 + \% G)^{(N/365)}$$

where "N" is the number of days since periodic value "P" was last calculated; and "% G" is an annual percentage rate. If at step 622, a first withdrawal has been taken, then at step 624 protected value 140 is set as equal to periodic value "P". In certain embodiments, if a first withdrawal has not been taken by a specified date, such as for example the tenth anniversary of a guarantee, then protected value is set as equal to the periodic value "P" on that specified date. In certain embodiments, method 600 may be performed by one or more software modules running on one or more computers.

Although FIG. 8 discloses one embodiment, various steps may be added or omitted without departing from the scope of the invention. In addition, some of the illustrated steps could be performed differently or in a different order without departing from the scope of the invention.

Figure 9:
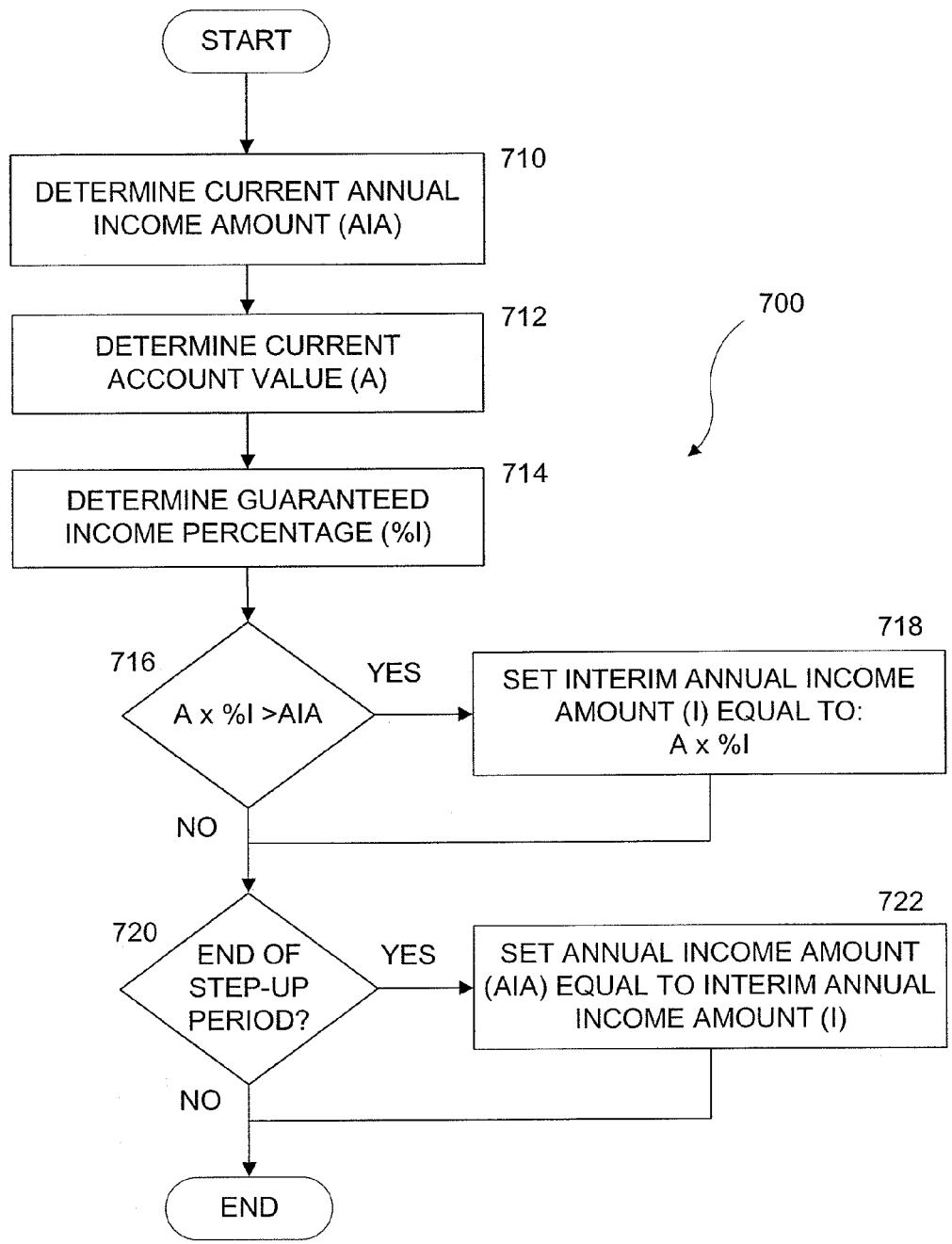
FIG. 9 provides a flow chart illustrating an example method for use in managing a financial instrument including a lifetime payment guarantee with an automatic step-up according to a particular embodiment.

FIG. 9 provides a flow chart illustrating an example method 700 for use in managing financial instrument 100, including lifetime payment guarantee 104 with an automatic step-up, according to a particular embodiment. Method 700 represents an example method for calculating an interim annual income amount "I" that takes into account available information about future automatic step-ups. In the example embodiment shown, financial instrument 100 provides for automatic step-ups on an annual basis, with annual income amount 142 being set as equal to the greater of the current annual income amount 142 and the highest account value at each quarter anniversary during that year multiplied by a guaranteed income percentage "% I".

At step 710, the current annual income amount 142 is determined. At step 712, a current account value "A" is determined. In certain embodiments, account value "A" may represent all or a portion of financial account 130, which may or may not include one or more variable investments 136 and/or one or more fixed investments 137. At step 714, a guaranteed income percentage "% I" is determined. In certain embodiments, the guaranteed income percentage "% I" may be a guaranteed income percentage associated with lifetime payment guarantee 104. In a particular embodiment, guaranteed income percentage "% I" is five percent and is associated with a guarantee of five percent income per year. If at step 716 current account value "A" multiplied by guaranteed income percentage "% I" is greater than annual income amount 142, then at step 718 an interim annual income amount "I" is set as equal to current account value "A" multiplied by guaranteed income percentage "% I". If at step 720 it is the end of the current step-up period, then at step 722 annual income amount 142 is set as equal to interim annual income amount "I".

In embodiments in which the step-up period is one year and the step-up is based on a highest quarter anniversary values, method 700 may be performed on a quarterly basis and the automatic step-up may occur every fourth time that method 700 is performed. In alternative embodiments, method 700 may be performed on a scheduled periodic basis, with the period being daily, weekly, monthly, quarterly, yearly, or any other appropriate period. Similarly, in alternative embodiments, the automatic step-up period may be a quarter, a month, or any other appropriate period of time. In certain embodiments, method 700 may be performed by one or more software modules running on one or more computers.

Although FIG. 9 discloses one embodiment, various steps may be added or omitted without departing from the scope of the invention. In addition, some of the illustrated steps could be performed differently or in a different order without departing from the scope of the invention.

Figure 10A:
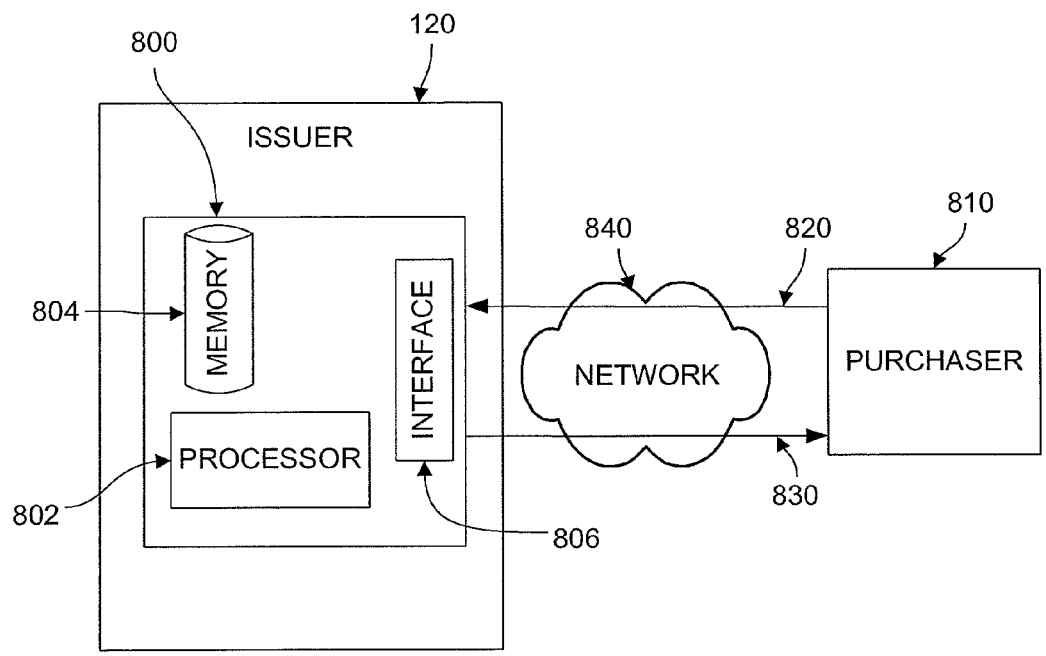
FIGS. 10A-10B illustrate an example data processing system for providing a financial instrument according to a particular embodiment.
Figure 10B:
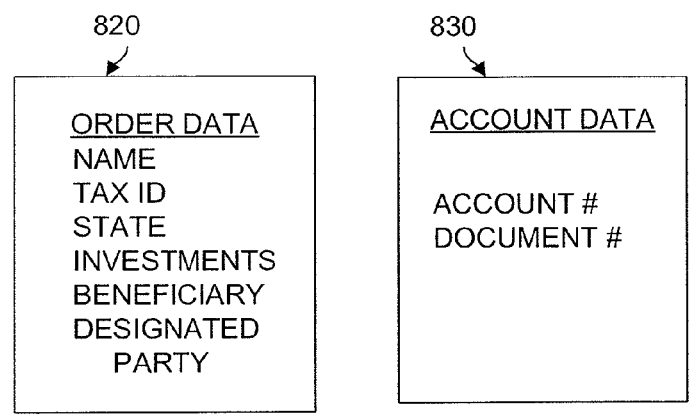

FIGS. 10A and 10B illustrate an example data processing system 800 for providing financial instrument 100 according to a particular embodiment. While in certain embodiments financial instrument 100 is entered into without using a computer, other embodiments may have a computerized option for entering into an agreement. Data processing system 800 represents hardware and controlling logic for providing financial instrument 100. In the embodiment shown, data processing system 800 may include processing module 802, memory 804, and interface 806. As shown, data processing system 300 may be included as a system controlled by issuer 120. However, in other embodiments data processing system 300 may be external to issuer 120. Additionally, although data processing system 300 is shown as a single system, data processing system 300 may be distributed across multiple platforms housed in multiple locations, some or all of which may or may not be controlled by issuer 120.

Processing module 802 may control the operation and administration of elements within data processing system 800 by processing information received from interface 806 and memory 804. Processing module 802 may include any hardware and/or controlling logic elements operable to control and process information. For example, processing module 802 may be a computer, programmable logic device, a microcontroller, and/or any other suitable device or group of devices.

Memory 804 may store, either permanently or temporarily, data and other information for processing by processing module 802 and communication using interface 806. Memory 804 may include any one or a combination of volatile or nonvolatile local or remote devices suitable for storing information. For example, memory 804 may include random access memory (RAM), read only memory (ROM), magnetic storage devices, optical storage devices, or any other suitable information storage device or combination of these devices. Memory 804 may store, among other things, order data 820 and account data 830.

Interface 806 communicates information to and receives information from devices or systems coupled to data processing system 800. For example, interface 806 may communicate with other elements controlled by issuer 120, network 840, and/or elements coupled to network 840. Thus interface 806 may include any hardware and/or controlling logic used to communicate information to and from elements coupled to data processing system 800.

Network 840 represents communication equipment, including hardware and any appropriate controlling logic, for interconnecting elements coupled to network 840. Thus network 840 may represent a local area network (LAN), a metropolitan area network (MAN), a wide area network (WAN), and/or any other appropriate form of network. Furthermore, elements within network 840 may utilize circuit-switched, packet-based communication protocols and/or other communication protocols to provide for network communications. The elements within network 840 may be connected together via a plurality of fiber-optic cables, coaxial cables, twisted-pair lines, and/or other physical media for transferring communications signals. The elements within network 840 may also be connected together through wireless transmissions, including infrared transmissions, 802.11 protocol transmissions, laser line-of-sight transmissions, or any other wireless transmission method.

In operation, order data 820 may be transmitted from purchaser 810 to data processing system 800 through network 840. Data processing system may process order data 820, generate account data 830, and transmit account data 830 to purchaser 810 through network 840. Purchaser 810 may represent one or more customers 110 or purchaser 810 may represent one or more intermediaries acting on behalf of customers 110.

Order data 820 may include the name of account holder 112, one or more tax identifiers, the resident state of account holder 112, an initial investment allocation designation, and a designation of beneficiary 114 and/or designated party 116. In certain embodiments, among other information, order data may also include information related to the selection of one or more electable options. Account data 830 may include an account number and a document, or reference to a document, containing the provisions of financial instrument 100.

Upon receipt of order data 820, data processing system may store all or a portion of order date 820 in memory 804. For example, data processing system may store one or more identifiers for account holder 112, such as a name, a tax identifier, etc. As another example, data processing system may store information identifying selected options. Data processing system 800 may calculate any applicable fees associated with the provisions of financial instrument 100, including any selected options. Data processing system may also identify financial account 130 and identify assets and fees associated with financial account 130.

In certain embodiments, purchaser 310 may initiate the transmission of order data 820 through the use of a web-based application. For example, purchaser 810 may access one or more websites and may submit certain portions of order data 820 using those websites. Similarly, purchaser 810 may utilize one or more electronic fund transfer (EFT) technologies to purchase financial instrument 100. The use of internet technologies to purchase financial instrument 100 may involve the use of one or more security provisions such as digital signatures, digital certificates, passwords, and encryptions. In certain embodiments, the collection of order data 820 may occur through the use of an interactive process. For example, a web-based application may present a series of questions to purchaser 810, which purchaser 810 may respond to and, in responding, submit the contents of order data 820.

Figure 11:
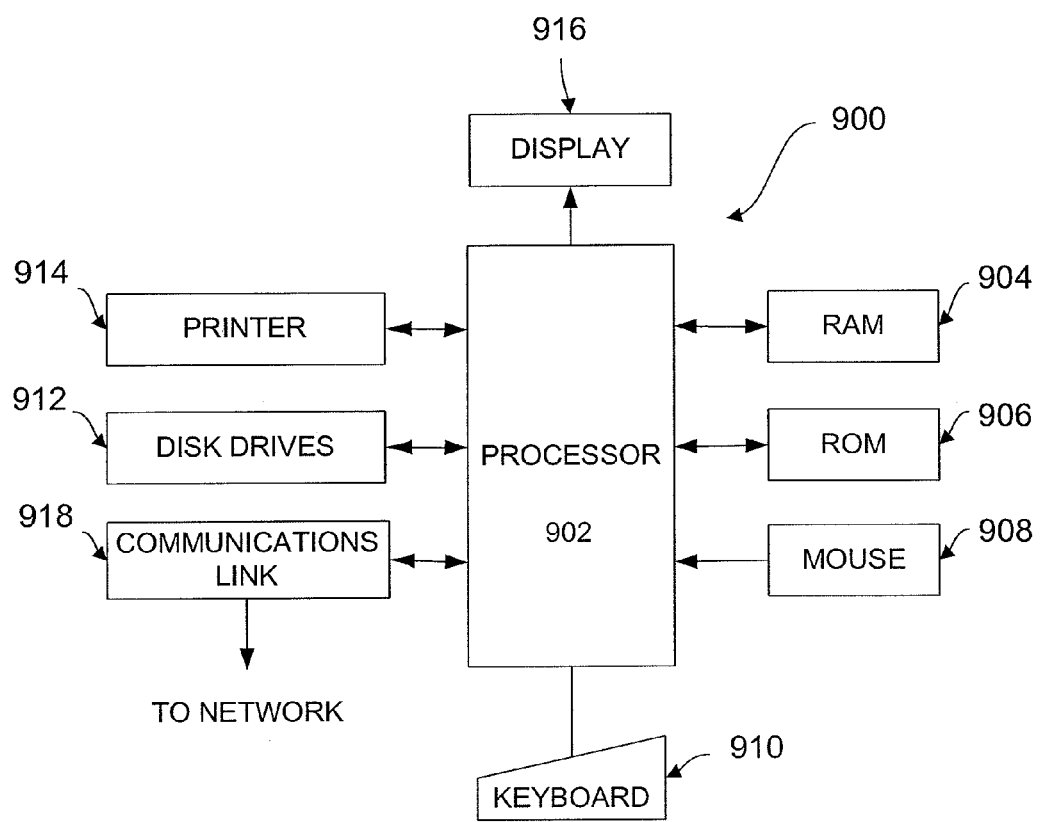
FIG. 11 illustrates an embodiment of a general purpose computer.

FIG. 11 is an embodiment of a general purpose computer 900 that may be used in connection with one or more pieces of software used to implement the invention. General purpose computer 900 may generally be adapted to execute any of the well-known OS2, UNIX, Mac-OS, Linux, and Windows Operating Systems or other operating systems. The general purpose computer 900 in this embodiment comprises a processor 902, a random access memory (RAM) 904, a read only memory (ROM) 906, a mouse 908, a keyboard 910 and input/output devices such as a printer 914, disk drives 912, a display 916 and a communications link 918. In other embodiments, the general purpose computer 900 may include more, less, or other component parts. Embodiments of the present invention may include programs that may be stored in the RAM 904, the ROM 906 or the disk drives 912 and may be executed by the processor 902. The communications link 918 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 912 may include a variety of types of storage media such as, for example, floppy disk drives, hard disk drives, CD ROM drives, DVD ROM drives, magnetic tape drives or other suitable storage media.

Although FIG. 11 provides one embodiment of a computer that may be used with the invention, the invention may additionally utilize computers other than general purpose computers as well as general purpose computers without conventional operating systems. Additionally, embodiments of the invention may also employ multiple general purpose computers 900 or other computers networked together in a computer network. Most commonly, multiple general purpose computers 900 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 11, the logic comprises computer software executable on the general purpose computer 900. The medium may include the RAM 904, the ROM 906 or the disk drives 912. In other embodiments, the logic may be contained within hardware configuration or a combination of software and hardware configurations. The logic may also be embedded within any other suitable medium without departing from the scope of the invention.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicants wish to note that they do not intend any of the appended claims to invoke ¶6 of 35 U.S.C. §112 as this paragraph and section exists on the date of filing hereof unless "means for" or "step for" are used in the particular claim.

What is claimed is:

1. A non-transitory computer-readable medium comprising software operable, when executed by one or more computers, to:
  determine a current account balance for a financial account wherein:
    at least a portion of the financial account is held in a variable sub-account comprising one or more investments selected by an account holder; and
    the financial account is associated with a guarantee of a protected value, the protected value comprising at least an amount based upon the initial account balance growing at a minimum positive growth rate for at least a defined period of time or until one or more defined events occur, whichever is sooner;

calculate a liability ratio for the financial account; and determine whether to transfer at least a portion of the account balance from the variable sub-account to a low-risk sub-account comprising one or more investments having a lower expected return and a lower risk than the variable sub-account, the determination based on the liability ratio;

wherein the liability ratio, used to determine whether to transfer at least a portion of the account balance from the variable sub-account to the low-risk sub-account when the variable sub-account is greater than zero, is calculated based on an expected liability, the value of the variable sub-account; and the value of the low-risk sub-account.

2. The software of claim 1, wherein the software is further operable, when executed by one or more computers, to calculate the portion of the account balance to transfer from the variable sub-account to the low-risk sub-account, the calculation being based on the liability ratio.

3. The software of claim 1, wherein the software is further operable, when executed by one or more computers, to calculate the expected liability.

4. The software of claim 3, wherein the calculated expected liability is based on the age of a designated party.

5. The software of claim 1, wherein the liability ratio, used to determine whether to transfer at least a portion of the account balance from the variable sub-account to the low-risk sub-account when the variable sub-account is greater than zero, is calculated based on the formula:

$$R=(L-F)/V$$

"R" being the liability ratio;
"L" being the expected liability;
"V" being the current value of the variable sub-account; and
"F" being the current value of the low-risk sub-account.

6. The software of claim 1, wherein the initial account balance is equal to the initial deposit amount.

7. The software of claim 1, wherein the minimum positive growth rate is a fixed rate between four percent and six percent.

8. The software of claim 1, wherein the minimum positive growth rate is a variable rate.

9. The software of claim 8, wherein the minimum positive growth rate is based on a consumer price index.

10. The software of claim 1, wherein the initial deposit is based on an account balance from an existing contract.

11. The software of claim 1, wherein the percentage of the protected value is independent of a designated party's age.

12. The software of claim 1, wherein the percentage of the protected value is independent of a designated party's age, gender, and health status.

13. A method for providing a financial instrument, the method comprising:

determining a current account balance for a financial account wherein:

at least a portion of the financial account is held in a variable sub-account comprising one or more investments selected by an account holder;

the financial account is associated with a guarantee of a protected value, the protected value comprising at least an amount based upon the initial account balance growing at a minimum positive growth rate for at least a defined period of time or until one or more defined events occur, whichever is sooner; and using one or more computers, calculating a liability ratio for the financial account; and determining whether to transfer at least a portion of the account balance from the variable sub-account to a low-risk sub-account comprising one or more investments having a lower expected return and a lower risk than the variable sub-account, the determination based on the liability ration;

wherein the liability ratio, used to determine whether to transfer at least a portion of the account balance from the variable sub-account to the low-risk sub-account when the variable sub-account is greater than zero, is calculated based on an expected liability, the value of the variable sub-account; and the value of the low-risk sub-account.

14. The method of claim 13, further comprising calculating the portion of the account balance to transfer from the variable sub-account to the low-risk sub-account, the calculation being based on the liability ratio.

15. The method of claim 13, further comprising calculating the expected liability.

16. The method of claim 15, wherein the calculated expected liability is based on the age of a designated party.

17. The method of claim 13, wherein the liability ratio, used to determine whether to transfer at least a portion of the account balance from the variable sub-account to the low-risk sub-account when the variable sub-account is greater than zero, is calculated based on the formula:

$$R=(L-F)/V$$

"R" being the liability ratio;
"L" being the expected liability;
"V" being the current value of the variable sub-account; and
"F" being the current value of the low-risk sub-account.

18. The method of claim 13, wherein the initial account balance is equal to the initial deposit amount.

19. The method of claim 13, wherein the minimum positive growth rate is a fixed rate between four percent and six percent.

20. The method of claim 13, wherein the minimum positive growth rate is a variable rate.

21. The method of claim 20, wherein the minimum positive growth rate is based on a consumer price index.

22. The method of claim 13, wherein the initial deposit is based on an account balance from an existing contract.

23. The method of claim 13, wherein the percentage of the protected value is independent of a designated party's age.

24. The method of claim 13, wherein the percentage of the protected value is independent of a designated party's age, gender, and health status.

25. A financial instrument management system comprising:

one or more computers;

software stored on computer-readable media and operable, when executed by the one or more computers, to:

determine a current account balance for a financial account wherein:

at least a portion of the financial account is held in a variable sub-account comprising one or more investments selected by an account holder; and the financial account is associated with a guarantee of a protected value, the protected value comprising at least an amount based upon the initial account balance growing at a minimum positive growth rate for at least a defined period of time or until one or more defined events occur, whichever is sooner;

calculate a liability ratio for the financial account; and
determine whether to transfer at least a portion of the account balance from the variable sub-account to a low-risk sub-account comprising one or more investments having a lower expected return and a lower risk than the variable sub-account, the determination based on the liability ratio;

wherein the liability ratio, used to determine whether to transfer at least a portion of the account balance from the variable sub-account to the low-risk sub-account when the variable sub-account is greater than zero, is calculated based on an expected liability, the value of the variable sub-account; and the value of the low-risk sub-account.

26. The financial instrument management system of claim 25, wherein the software is further operable, when executed by the one or more computers, to calculate the portion of the account balance to transfer from the variable sub-account to the low-risk sub-account, the calculation being based on the liability ratio.

27. The financial instrument management system of claim 25, wherein the software is further operable, when executed by one or more computers, to calculate expected liability.

28. The financial instrument management system of claim 25, wherein the liability ratio, used to determine whether to transfer at least a portion of the account balance from the variable sub-account to the low-risk sub-account when the variable sub-account is greater than zero, is calculated based on the formula:

$$R=(L-F)/V$$

"R" being the liability ratio;
"L" being the expected liability;
"V" being the current value of the variable sub-account; and
"F" being the current value of the low-risk sub-account.

29. The financial instrument management system of claim 25, wherein the initial account balance is equal to the initial deposit amount.

30. The financial instrument management system of claim 25, wherein the minimum positive growth rate is a fixed rate between four percent and six percent.

31. The financial instrument management system of claim 25, wherein the minimum positive growth rate is based on a consumer price index.

32. The financial instrument management system of claim 25, wherein the initial deposit is based on an account balance from an existing contract.

33. A method for providing a financial instrument, the method comprising:
determining a current account balance for a financial account wherein:
at least a portion of the financial account is held in a variable sub-account comprising one or more investments selected by an account holder; and
the financial account is associated with a guarantee of a protected value, the protected value comprising at least an amount based upon the initial account balance growing at a minimum positive growth rate for at least a defined period of time or until one or more defined events occur, whichever is sooner;
using one or more computers, calculating a liability ratio for the financial account; and
determining whether to transfer at least a portion of the account balance from the variable sub-account to a low-risk sub-account comprising one or more investments having a lower expected return and a lower risk than the variable sub-account, the determination based on the liability ration;
wherein the liability ratio, used to determine whether to transfer at least a portion of the account balance from the variable sub-account to the low-risk sub-account when the variable sub-account is greater than zero, is calculated based on an expected liability, the value of the variable sub-account; and the value of the low-risk sub-account.

34. The method of claim 33, further comprising calculating the portion of the account balance to transfer from the variable sub-account to the low-risk sub-account, the calculation being based on the liability ratio.

35. The method of claim 33, further comprising calculating the expected liability.

36. The method of claim 33, wherein the liability ratio, used to determine whether to transfer at least a portion of the account balance from the variable sub-account to the low-risk sub-account when the variable sub-account is greater than zero, is calculated based on the formula:

$$R=(L-F)/V$$

"R" being the liability ratio;
"L" being the expected liability;
"V" being the current value of the variable sub-account; and
"F" being the current value of the low-risk sub-account.

37. The method of claim 33, wherein the initial account balance is equal to the initial deposit amount.

38. The method of claim 33, wherein the minimum positive growth rate is a fixed rate between four percent and six percent.

39. The method of claim 38, wherein the minimum positive growth rate is based on a consumer price index.

40. The method of claim 33, wherein the initial deposit is based on an account balance from an existing contract.

* * * * *